(12) United States Patent
Reijersen Van Buuren et al.

(10) Patent No.: US 9,258,947 B2
(45) Date of Patent: Feb. 16, 2016

(54) CONTINUOUS BALE FORMING APPARATUS WITH A PIVOTAL BALE SUPPORTING CONSTRUCTION

(71) Applicant: FORAGE INNOVATIONS B.V., Maassluis (NL)

(72) Inventors: Willem Jacobus Reijersen Van Buuren, Maassluis (NL); Rudy De Jong, Maassluis (NL)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 14/395,747

(22) PCT Filed: Apr. 19, 2013

(86) PCT No.: PCT/NL2013/050290
§ 371 (c)(1),
(2) Date: Oct. 20, 2014

(87) PCT Pub. No.: WO2013/157950
PCT Pub. Date: Oct. 24, 2013

(65) Prior Publication Data
US 2015/0090131 A1   Apr. 2, 2015

(30) Foreign Application Priority Data

Apr. 20, 2012 (NL) ..................................... 2008667
Apr. 20, 2012 (NL) ..................................... 2008668

(51) Int. Cl.
*A01F 15/08* (2006.01)
*A01F 15/07* (2006.01)

(52) U.S. Cl.
CPC ........... *A01F 15/0705* (2013.01); *A01F 15/071* (2013.01); *A01F 15/0883* (2013.01); *A01F 2015/074* (2013.01); *A01F 2015/078* (2013.01); *A01F 2015/0735* (2013.01)

(58) Field of Classification Search
CPC .............. A01F 15/071; A01F 15/0705; A01F 15/0883; A01F 2015/0735; A01F 2015/074; A01F 2015/075
USPC ................... 100/2, 35, 40, 76, 87, 88; 56/341
See application file for complete search history.

(56) References Cited

U.S. PATENT DOCUMENTS 4,062,172 A * 12/1977 Rice .................... A01F 15/0705
                                                          100/77
4,534,285 A    8/1985 Underhill
(Continued)

FOREIGN PATENT DOCUMENTS

EP      0 064 117 A1    11/1982
EP      0 672 340 B1     4/2000
(Continued)

*Primary Examiner* — Jimmy T Nguyen
(74) *Attorney, Agent, or Firm* — Birch, Stewart, Kolasch & Birch, LLP

(57) ABSTRACT

A bale forming apparatus and a bale forming method form cylindrical bales. An intake device conveys material into a bale forming chamber. A bale is formed in the bale forming chamber. A bale pushing device pushes the bale onto a bale supporting construction being in a bale receiving position. This bale supporting construction buffers the bale. A pivoting mechanism pivots the bale supporting construction carrying the bale from the bale receiving position into a bale supporting position. The distance between the bale on the bale supporting construction and the outlet is increased. The creation of a further bale in the bale forming chamber is started. The bale supporting construction carrying the bale is pivoted from the bale supporting position into a bale ejecting position. The bale is ejected.

18 Claims, 29 Drawing Sheets

(56) References Cited

U.S. PATENT DOCUMENTS

| | | | |
|---|---|---|---|
| 4,597,254 A | 7/1986 | Bowden, Jr. | |
| 4,625,502 A * | 12/1986 | Gerhardt | A01F 15/0705 100/88 |
| 4,667,592 A * | 5/1987 | Pentith | A01F 15/0705 100/77 |
| 5,365,836 A | 11/1994 | Campbell | |
| 6,729,118 B2 * | 5/2004 | Viaud | A01F 15/0705 100/88 |
| 2011/0168038 A1 * | 7/2011 | Viaud | A01F 15/07 100/88 |
| 2012/0204738 A1 | 8/2012 | Reijersen Van Buuren | |

FOREIGN PATENT DOCUMENTS

| | | |
|---|---|---|
| EP | 1 264 532 A1 | 12/2002 |
| FR | 2 368 214 A1 | 5/1978 |
| FR | 2 591 849 A1 | 7/1983 |
| GB | 2 111 903 A | 7/1983 |
| WO | WO 2011/053120 A1 | 5/2011 |

* cited by examiner

CONTINUOUS BALE FORMING APPARATUS WITH A PIVOTAL BALE SUPPORTING CONSTRUCTION

BACKGROUND

The present invention relates to a bale forming apparatus and a bale forming method for forming cylindrical bales.

A bale forming apparatus as used for agricultural purposes is an agricultural vehicle to form bales of crop material. The bale forming apparatus usually comprises an intake device to take up crop material from a ground surface and a bale forming device to form a bale from the crop material.

In a known embodiment, the bale forming device comprises at least one endless pressing belt, preferably several parallel endless belts, guided by guiding rollers. An outlet of the intake device is arranged between two guiding rollers so that crop material is fed between the two guiding rollers towards the endless belt(s). Due to the feeding of crop material between the two guiding rollers a bale forming chamber is formed by the belt(s). By further feeding crop material through the outlet the bale forming chamber can be filled until a bale with a desired diameter is obtained.

The bale forming chamber is surrounded by a fixed front housing and a pivotal tailgate of the bale forming apparatus. For forming a bale under pressure the tailgate must be connected with the front housing. Opening of the pivotal tailgate ejects and thereby releases the bale from the bale forming chamber. Before ejecting a bale, this bale must be wrapped into a net or foil. Before the formation of a new bale under pressure can be started, the pivotal tailgate must be closed again.

The wrapping of the bale as well as the opening and closing of the tailgate take considerable time during which the bale forming apparatus cannot be used for formation of a new bale. This has the consequence that the intake of new crop material has to be temporarily interrupted by stopping the forward movement of the bale forming apparatus over the ground surface.

To overcome this disadvantage, several concepts for so-called continuous round balers were presented.

STATE OF THE ART

U.S. Pat. No. 4,597,254 discloses a continuous round baler. Pressing belts 68 are guided around several rollers 40, 42, 44, 46, 48, 50, 52, 54, 56, 58, 72, cf. FIG. 1. Two disks 68 are mounted on stub shafts 70 which are rotatably mounted at the two sidewalls 13. The indexing roller 72 connects the two disks 68 and has a distance to the rotating axis of the disks 68, i.e. to the stub shafts 70. Several teeth 74 at the peripheral edges of the disks 68 engage into sprockets 76 mounted on brackets 78. The sprockets 76 are connected by a cross shaft 80. One end of the shaft 80 is connected with a clutch and brake device.

Crop material is picked up by the baler of U.S. Pat. No. 4,597,254 and is conveyed through a nip between the conveyor 28 and a press roller 38. The clutch and brake device first operates as a brake and holds the disks 68 and thereby the indexing roller 72 in a home position. Between the lower span 67 of the belts 68 and the upper run 29 of the conveyor 28 a bale starting zone 69 is created. The bale increases in this bale starting zone 69 and stretches the belts 66. If the bale has reached a required diameter, the clutch and brake device operates as a clutch. The shaft 80 drives the sprocket 76 which causes the disks 68 rotating. The indexing roller 72 is moved away from the nip between the elements 28 and 38, cf. FIG. 2, on a circular path. The indexing roller 72 becomes out of engagement with the belts 66. The bale is moved away from the nip and engages partially into the tailgate 16, cf. FIG. 3 and FIG. 4. The disks 68 perform a 360 degrees rotation back into the home position. The baler starts to create a new bale.

U.S. Pat. No. 5,365,836 and EP 672340 B1 disclose a round baler 10 with a lower bale forming means (conveyor 24) and a serious of endless belts 45. The belts 45 are guided around rollers 31 to 34 mounted at the sidewalls 18 of the frame 11 and around further rollers 35 to 41 mounted at the pivotal tailgate 13. Two disks 46 are disposed parallel to the and between the sidewalls 18. An indexing member 48 has the form of a transverse roller and is mounted between the disks 46. Several teeth 50 at the peripheral edge of the disks 46 mesh with sprockets 51 which are connected with a cross shaft 53. This cross shaft 53 is connected with a clutch and brake device. The belts 45 are guided around an indexing member 48. A first baling chamber is formed above the conveyor 24 and below the belts 45. A second baling chamber is surrounded by the belts 45, cf. FIG. 1 and FIG. 2. The baler 10 operates similar to that baler described in U.S. Pat. No. 4,597, 254.

The round baler 10 of U.S. Pat. No. 4,534,285 comprises a first upper bale forming apron 26. This first apron 26 is guided around several guide members 28 to 42 mounted at the base frame 12 and guided around further guide members 44, 46, 48 mounted at the rear frame 22, cf. FIG. 1. A lower apron 20 is supported by the base frame 12. A second upper bale forming apron 52 is guided around members 54 to 62 mounted at the rear frame 22. The aprons 26, 52 are formed by an endless link-type chain. The guide members 40 around which the first upper apron 26 is guided are held by a pair of arms 68. These arms 68 are pivotally mounted on a shaft 70. Hydraulic cylinders 72 can pivot the arms 68. Several rams 66 are mounted below the apron 26 and extends between the sidewalls of the base frame 12. An actuator 76 connects the rams 66 with the arms 68. The guide members 40 can move up and down in longitudinal vertical slots 74 arranged in the sidewalls.

During operation of the baler 10 of U.S. Pat. No. 4,534,285 a front bale chamber 50 is formed between the lower apron 20 and the first upper apron 26, cf. FIG. 1. The guide members 40 are in the lowermost position in the slots 74. The apron 26 and the rams 66 close the rear end of the front bale chamber 50. A bale increases in the front bale chamber 50. When the bale has reached a preset diameter, the guide members 40 are moved in the slots 74 in the uppermost position, cf. FIG. 3. This is effected by the hydraulic cylinder 72 which moves the arms 68. The connecting actuator 76 causes the rams 66 moving downwards. The apron 20 transports the bale into a rear bale chamber 64, cf. FIG. 4. This rear bale chamber 64 is formed between the upper aprons 26 and 52 and a stationary roller 65. The guide members 40 are moved downwards into an intermediate position. The actuator 76 causes the rams 66 moving upwards again. The bale further increases while being in the rear bale chamber 64, cf. FIG. 5. The creation of a further bale in the front bale chamber 50 starts. If the bale in the rear bale chamber 64 has reached the predetermined size, the guide members 40 are moved in the lowermost position, cf. FIG. 6. The bale in the rear bale chamber 64 is wrapped, cf. FIG. 7, and is ejected, cf. FIG. 8.

WO 2011/053120 A1 and US 2012/0204738 A1 disclose a round baler working in a continuous manner. An endless belt 10 is guided around four moveable guiding elements 11a, 11b, 11c, and 11d and around a fixed guiding element 12 and a tensioning element 13. The four moveable guiding elements 11a, 11b, 11c, 11d are mounted on four arms 15 which in turn are mounted on a rotatable element 16, cf. FIG. 1. Every arm 15 can be rotated by means of an actuator 16. The two moveable guiding elements 11a, 11b form a first pair. The two moveable guiding elements 11c, 11d form a second pair. Every pair can be moved into an intake position, a release position, and a back end support position. This movement is effected by rotating the arms 15 around a horizontal axis through the rotatable element 16. FIG. 1 shows the first pair with the guiding elements 11a, 11b in the intake position near the outlet 8 of an intake device. The baling chamber is formed between these two guiding elements 11a, 11b. After the bale B is created, the first pair is rotated from the intake position into a release position, cf. FIG. 2. The bale B can be ejected. Simultaneously the second pair 11c, 11d is moved into the intake position such that the creation of a second bale B2 can be started before the first bale B is ejected.

EP 1264532 A1 discloses a round baler 10 with three guiding elements 54a, 56a, 58a mounted on three arms 54, 56, 58. Every guiding element 54a, 56a, 58a comprises two rollers. A flexible belt forming means 18, e.g. several endless belts, is guided around these six rollers of the three guiding elements and around further rollers. Every arm 54, 56, 58 is formed of two parts 60, 62. These arm parts 60, 62 are hingedly connected or are connected like a telescope. The three guiding elements 54a, 56a, 58a define a main bale forming chamber 24 and an auxiliary bale forming chamber 26, cf. FIG. 5. A bale 22 is formed in the auxiliary bale forming chamber 26 defined by the guiding elements 54a and 56a, cf. FIG. 2. By rotating the arms 54, 56 the bale 22 is moved away from the intake into a transition position. The arms are further rotated and the bale 20 in the main bale forming chamber 24 reaches its full size, cf. FIG. 4. This bale 20 is wrapped while a further bale 22 is formed in the auxiliary bale forming chamber 26 which is now formed by the guiding elements 56a and 58a, cf. FIG. 5. The wrapped bale is ejected, cf. FIG. 6.

Problem, Solution

The problem solved by the invention is to provide a bale forming apparatus and a bale forming method which form cylindrical bales in a continuous manner by using a reliable and sufficiently large buffer means even in the case that a lot of material is picked up and is conveyed in the time period in which a completed bale has to be wrapped and ejected. "Continuous manner" means: The bale forming apparatus needs to be stopped for finishing a bale formed in bale forming chamber, in particular not to be stopped for wrapping the bale.

The problem is solved by a bale forming apparatus and a bale forming method according to the present invention.

The invention provides a bale forming apparatus and a bale forming method. At least two cylindrical bales are formed from material. The bale forming apparatus comprises the following parts and these parts are used by the bale forming method:

An intake device conveys material through an outlet of the intake device into a bale forming chamber being arranged adjacent to the outlet.

This bale forming chamber is surrounded by a bale forming means.

A bale forming device forms a cylindrical bale in the bale forming chamber by using the bale forming means. This bale is formed from material conveyed into the bale forming chamber.

Afterwards a bale pushing device pushes the bale away from the outlet and onto a bale supporting construction being in a bale receiving position. The bale supporting construction carries the bale after this pushing step. The bale supporting construction buffers the bale until the bale is finished and ejected.

A pivoting mechanism pivots the bale supporting construction carrying the bale from the bale receiving position into a bale supporting position. This pivotal movement increases the distance between the bale on the bale supporting construction and the outlet of the intake device.

The creation of a further bale in the bale forming chamber adjacent to the outlet is started while the bale supporting construction carries the bale. This bale forming chamber surrounded by the bale forming means is also provided when the bale supporting construction carries a bale, in particular if the bale supporting construction is in the bale supporting position. Therefore the bale forming apparatus carries temporarily two bales: The old bale on the bale supporting construction and the new bale growing the bale forming chamber adjacent to the outlet.

The bale supporting construction carrying the bale is pivoted from the bale supporting position into a bale ejecting position. The bale is ejected.

Advantages

The invention provides a bale forming apparatus and a bale forming method which can be operated in a continuous manner, i.e. can form, wrap, and eject cylindrical bales without the need of stopping the bale forming apparatus. While the bale on the bale supporting construction is wrapped and ejected, the intake device can convey further material picked-up from the ground through the outlet and this material can be stored in the bale forming chamber and can be used for forming a new bale. As the bale pushing device has pivoted the old bale away from the outlet and onto the bale supporting construction, the bale forming chamber adjacent to the outlet is released from the bale and can press or otherwise process further material which is conveyed through the outlet. The formation of a new bale is started while the old bale is still on the bale supporting construction and can be finished there.

The bale supporting construction behind the bale forming chamber buffers a bale until the creation of this bale is finished. The creation of a new bale can already be started while the bale supporting construction in the bale supporting position carries the old bale. It is possible to complete forming the bale while the bale is on the bale supporting construction, e.g. by wrapping the bale into a net or a foil. This completion step can be performed outside the bale forming chamber adjacent to the outlet such that the bale forming chamber is released for forming a further bale. This effect is achieved as the old bale is carried by the bale supporting construction in a sufficient distance from the outlet until the formation of this old bale is finished.

During this buffer step further material can be picked up and can be processed in the bale forming chamber surrounded by the bale forming means. It is not necessary to stop the bale forming apparatus for completing the bale.

The invention does not require two parallel bale forming chambers. Thanks to the invention it is also not necessary to provide a pre-baling chamber or a pre-pressing channel or a pre-storage being situated upwards from the bale forming chamber. In particular no chamber or channel between the outlet of the intake device and the baling chamber is required. In contrast to a baler with a pre-baling chamber or a pre-pressing channel, a formed bale is stored on the bale supporting construction before being ejected. This bale supporting construction can operate as a tailgate or can be integrated into a tailgate which is pivotally connected with a front housing and which can be opened for ejecting a bale. Therefore the invention provides a baler which can be implemented with a smaller length than other continuous balers. The invention can be implemented by adapting an existing tailgate which in addition serves as the bale supporting construction which can be pivoted into the three positions and carries a bale formed in the bale forming chamber and pushed away from the outlet.

According to the invention a bale forming apparatus with a bale forming means surrounding a bale forming chamber and with a bale supporting construction is provided. It is possible to arrange the bale supporting construction sufficiently far away from the outlet of the intake device and therefore sufficiently far away from the bale forming chamber adjacent to the outlet. One effect is that an old bale on the bale supporting construction does not hamper the forming of a new bale in the bale forming chamber—even in the case that a lot of material is conveyed through the outlet in the time period between pushing the old bale away from the outlet and ejecting this bale.

According to the invention the bale supporting construction carries the bale and is pivoted from the bale receiving position into the bale ejecting position. But the bale supporting construction is not pivoted directly but is first pivoted from the bale receiving position into an intermediate bale supporting position and from this intermediate bale supporting position into the bale ejecting position. In this intermediate bale supporting position the distance between a bale on the bale supporting construction and the outlet is greater than with the bale supporting construction being in the bale receiving position. On the one hand the bale pushing device pushes the bale over a shorter distance, namely only to the bale supporting construction in the bale receiving position. On the other hand more space adjacent to the outlet of the intake device is available while a completed bale is on the bale supporting construction being in the bale supporting position and before the bale is ejected. Therefore larger bales can be created.

In particular more space for the bale forming chamber is available. The bale forming chamber is expanded by the growing new bale. As the bale supporting chamber is first pivoted into the bale supporting position, more space for the bale forming chamber adjacent to the outlet is available and therefore more time for completing the formation of the new bale on the bale supporting chamber can be used.

The bale on the bale supporting construction being in the bale supporting position does not hamper the formation of a new bale in the bale forming chamber adjacent to the outlet. This effect is in particular achieved as pivoting the bale supporting construction into the bale supporting position increases the distance between the bale on the bale supporting construction and the outlet and therefore the distance between the old bale in the bale forming chamber in which the new bale increases.

Thanks to the invention it is easier to adapt the bale forming apparatus to given requirements, e.g. to a required bale size or to a given throughput of material through the outlet. These two requirements can be fulfilled by arranging the bale supporting construction in the bale supporting position in a proper distance and a proper position with respect to the outlet. Further requirements stemming from a proper ejection of the bale can be solved by arranging the bale supporting construction in the bale ejecting position and the pivoting mechanism in a proper way. The invention makes this adaption easier as a bale supporting position is distinguished from a bale ejecting position.

According to the invention the bale supporting construction being in the bale supporting position carries the bale before being pivoted into the bale ejecting position for ejecting the bale. While the bale supporting construction being in the bale supporting position carries the bale it is possible to finish the formation of the bale, e.g. by wrapping the bale into a net or a foil while the bale is on the bale supporting construction. The bale forming chamber adjacent to the outlet is not used for this completion of the bale forming. Therefore further material can be conveyed through the outlet into the bale forming chamber and the formation of a new bale can be started before the old bale is completely formed and can be ejected. The bale forming apparatus carries two bales at the same time:
- the old bale on the bale supporting construction being in the bale supporting position and
- a new bale increasing in the bale forming chamber adjacent to the outlet.

The bale supporting construction is not pivoted into the bale ejecting position until the formation of the old bale is completed.

According to the invention the bale is finished and is released in three steps. In the first step the bale is pushed onto the bale supporting construction being in the bale receiving position. In the second step the bale supporting construction with the bale is pivoted into the intermediate bale supporting position. In the third step the bale is ejected by pivoting the bale supporting construction into the bale ejecting position.

The invention makes it possible to provide three different actuating devices for these three steps which actuating devices are adapted to the characteristics of the respective step. For every step a specific actuating device can be provided. The bale pushing device operates as the actuating device for the first step and is not necessarily required for the second step and for the third step. The first step requires pushing a bale having the final size and preferably being surrounded by the bale forming means away from the outlet. The second step and the third step are performed by pivoting the bale supporting construction carrying the bale. In general the bale is moved in an approximately horizontal direction in the second step whereas the bale is ejected in the third step. In general the third step requires that the bale supporting construction is rotated around a horizontal pivoting axis. Thanks to the invention it is possible to provide two different actuating devices for the second step and for the third step. The invention makes it possible that every actuating device is tailored to the specific pivoting step (to be bale supporting position or to the bale ejecting position) and is a part of the pivoting mechanism.

EMBODIMENTS

The bale forming means surrounding the bale forming chamber may comprise several pressing rollers, one endless pressing belt, several parallel endless pressing belts and/or an apron with linked chain elements.

In one embodiment the bale forming means is guided by several guiding members. Every guiding member may comprise a roller which can rotate around a rotating axis being perpendicular to the conveying direction of the bale forming means and parallel to the rotating axis of the holding device. A guiding member can also comprise a rigid rod.

In a preferred embodiment the bale is moved from the bale forming chamber onto the bale supporting construction in two consecutive steps. In the first step the bale pushing device pushes the bale away from the outlet onto the bale supporting construction. In the consecutive second step the bale supporting construction with the bale is pivoted into the bale supporting position.

In one embodiment a bale on the bale supporting construction in carried only by the bale support construction when the bale supporting construction is in the bale supporting position or in the bale ejecting position. If the bale supporting construction is in the bale receiving position, the bale is additionally supported by the bale pushing device and/or by a stationary or pivotal roller adjacent to the outlet. This embodiment makes it possible that a carrying member of the bale supporting constructing is tilted towards the outlet.

In one embodiment the bale supporting construction moves a bale in an approximately horizontal direction when being pivoted from the bale receiving position into the bale supporting position. The bale is supported in a good manner while being pivoted in horizontal direction. A first actuating part of the pivoting mechanism effects this horizontal movement. This first actuating part is adapted for such a horizontal movement.

In one embodiment this first part for the horizontal movement is pivotally connected with a linking mechanism which is mounted on a frame of the bale forming apparatus. The first actuating part is adapted for pivoting the bale supporting construction between the bale receiving position and the bale supporting position. For doing so the first actuating part pivots the linking mechanism which causes the bale supporting construction to be moved in an approximately horizontal direction. It is possible to provide guiding elements for the bale supporting construction such that the bale supporting construction can only be moved in a horizontal direction until reaching the bale supporting position.

In an embodiment a second actuating part of the pivoting mechanism is also pivotally connected with the linking mechanism. This second actuating part is adapted for pivoting the linking mechanism around the horizontal pivoting axis. Pivoting the linking mechanism around this pivoting axis causes the bale supporting construction to be pivoted from the bale supporting position into the bale ejecting position.

In one embodiment the bale forming apparatus is arranged such that the bale supporting construction can be pivoted around a horizontal pivoting axis in both directions, in particular be rotated around this axis. Pivoting the bale supporting construction in a direction away from the outlet causes the bale supporting construction to be pivoted from the bale supporting position into the bale ejecting position. Pivoting the bale supporting construction in the opposite direction causes the bale supporting construction to be pivoted from the bale ejecting position back into the bale supporting position. Preferably the bale supporting construction is pivoted about a pivoting angle of more than 90 degrees around this pivoting axis when being pivoted into the bale ejecting position. This embodiment provides a large aperture for releasing a bale while the bale supporting construction is in the bale ejecting position even if the bale has to be ejected in an uphill direction. Never the less the bale supporting construction in the bale supporting position can provide in approximately horizontal carrying member for a bale.

In one embodiment the bale supporting construction or at least a part of the bale supporting construction can be pivoted around the pivoting axis arranged on the linking mechanism which was just sketched. Pivoting the part around this pivoting axis pivots the bale supporting construction from the bale supporting position into the bale ejecting position. Preferably this pivotal movement transfers a carrying member for carrying the bale from an approximately horizontal position into a tilted position which makes the bale rolling downwards under the force of gravity such that the bale is ejected.

The embodiments just sketched provide a linking mechanism for pivoting the bale supporting construction into the bale supporting position and a tilting mechanism for pivoting it into the bale ejecting position. It is also possible to provide two linking mechanisms or two tilting mechanisms.

In one embodiment the bale forming apparatus comprises a bale forming means which is guided around several guiding members. The bale forming means may comprise several pressing belts or rollers or at least one chain-like apron. One of these guiding members is connected with the pivotal bale supporting construction. Therefore the bale forming means also keeps the bale when the bale is on the bale supporting construction.

In one embodiment at least one guiding member is mounted at the bale supporting construction. When the bale supporting construction is in the bale receiving position, this connected guiding member is in a lowered position and does not inhibit the bale pushing device from pushing the bale onto the bale supporting construction. When the bale supporting construction carrying the bale is pivoted into the bale supporting position, this guiding member connected with the bale supporting construction is raised upwards. This embodiment leads to a shorter bale forming apparatus in comparison with other arrangements of guiding members and bale pushing devices.

In one embodiment this guiding member is mounted at a bale carrying member. This bale carrying member is pivotally connected with a bale supporting frame. The bale supporting frame and the bale carrying member belong to the bale supporting construction. When the bale supporting construction is in the bale supporting position, the bale carrying member carries a bale. Preferably the bale supporting frame is pivotally connected with a frame of the bale forming apparatus and carries the bale carrying member. The bale carrying member can be pivoted with respect to the bale supporting frame around a horizontal pivoting axis. Preferably the guiding member is mounted at a free end of the bale carrying member. For a lowering up or down the guiding member, the bale carrying member is pivoted with respect to the bale supporting frame around this horizontal pivoting axis.

One embodiment provides a very simple and reliable bale pushing device. A drive rotates a holding device around a rotating axis in a rotating direction. This rotation causes a connected pushing member to push a bale away from the outlet onto the bale supporting construction being in the bale receiving position. This holding device may comprise two parallel supporting disks which can be rotated around the rotating axis. The pushing member is connected with both supporting disks and extends between these disks.

Preferably a pivotal guiding member contributes to guide the bale forming means and thereby to provide a bale forming chamber adjacent to the outlet even if a bale is on the bale supporting construction. This guiding member can be pivoted into a guiding position. In this guiding position the pivotal guiding member guides the bale forming means. Preferably the pivotal guiding member in the guiding position is arranged between the outlet and the bale supporting construction. Thereby the bale forming means guided around this guiding member inhibits loose material conveyed through the outlet to be pushed onto the bale supporting construction.

The pivotal guiding member enables in an easy way that one segment of the bale forming means surrounds the bale forming chamber adjacent to the outlet. If the bale supporting construction is in the bale supporting position, a further segment of the bale forming means surrounds a bale on the bale supporting construction while the bale is finished. The pivotal guiding member in the guiding position defines and separates these two segments from each other. It is not necessary to provide a specific bale keeping means for keeping a bale being on the bale supporting construction and prevents the bale from falling apart. It is possible to pivot the pivotal guiding member into a parking position while no bale is on the bale supporting construction.

Preferably at least one of the following events triggers the step that the pivotal guiding member is pivoted into the guiding position:

The bale pushing device pushes a bale onto the bale supporting construction being in the bale receiving position.
The pivoting mechanism pivots the bale supporting construction from the bale receiving position into the bale supporting position.

It is possible that only the first event or only the second event triggers the step of pivoting the guiding member. Or that event which occurs as first triggers pivoting the guiding member.

In one embodiment the pivotal guiding member is mechanically connected with the bale pushing device. In a further embodiment the pivotal guiding member is mechanically connected with the bale supporting construction. It is also possible that a control unit controls the pivoting mechanism for the bale supporting construction as well as a drive for this pivotal guiding member.

In one embodiment the bale in the bale forming chamber is rotated by the bale forming means surrounding the bale forming chamber. This rotating bale is wrapped before being ejected. The wrap prevents the bale from falling apart. For wrapping the bale wrapping material (net or foil or twine, e.g.) is injected into the space between the bale and the bale forming means surrounding the bale forming chamber. This injected wrapping material is pulled by the bale forming member and/or the rotating bale. The wrapping is completed when the bale is on the bale supporting construction being in the bale supporting position. In one embodiment the wrapping procedure already starts before the bale supporting construction is pivoted in the bale supporting position. The bale supporting construction is pivoted into the bale supporting position before the wrapping material is pulled in a position between the outlet and the bale forming chamber.

In one embodiment the bale pushing device is pivoted in a position where it shortly blocks the path of material through the outlet into the bale forming chamber. No material can be conveyed into the bale forming chamber for a short period. One embodiment solves this problem as follows: The intake device comprises a feeding channel with a pivotally mounted feeding channel bottom. The feeding channel leads from an inlet of the intake device to the outlet. The channel bottom can be lowered down such that the capacity of the intake device is increased. The increased buffering capacity allows to buffer material until the outlet is no longer blocked. Material can be buffered in this enlarged intake device until the pushing member has passed the outlet. A resilient means, e.g. a spring, pivots the channel bottom back into the standard position. The channel bottom is lowered downwards against the force of this resilient means.

In one embodiment the bale forming apparatus is moved over ground. A pick-up unit picks up material from the ground and conveys the material to the intake device. This application is in particular used for forming cylindrical bales from agricultural material (hay, straw, silage, e.g.). The bale forming apparatus may be a self-propelled vehicle or is pulled by a tractor.

In a further embodiment the bale forming apparatus operates as a stationary plant. Material is fed to the intake device. This application is in particular used for compacting recycling material, e.g. paper or card board or plastic material.

BRIEF DESCRIPTION OF EMBODIMENT THE DRAWINGS

In the following an embodiment of the invention is described by means of the following figures.

Figure 7:
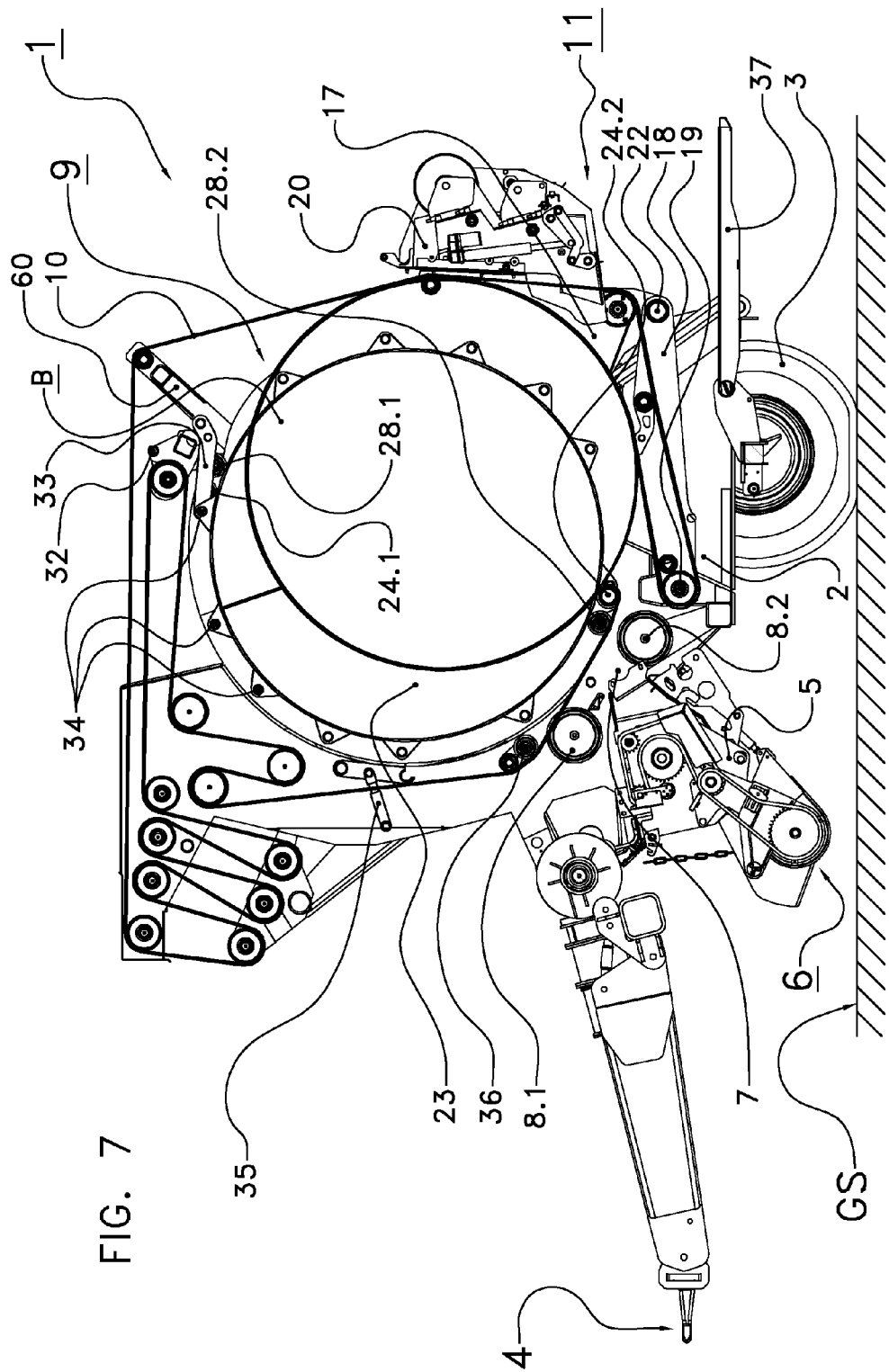
FIG. 7 shows the bale forming apparatus of FIG. 6 with the tailgate bottom roller being lowered down away from the circular path and the bale supporting construction still in the bale receiving position.
Figure 8:
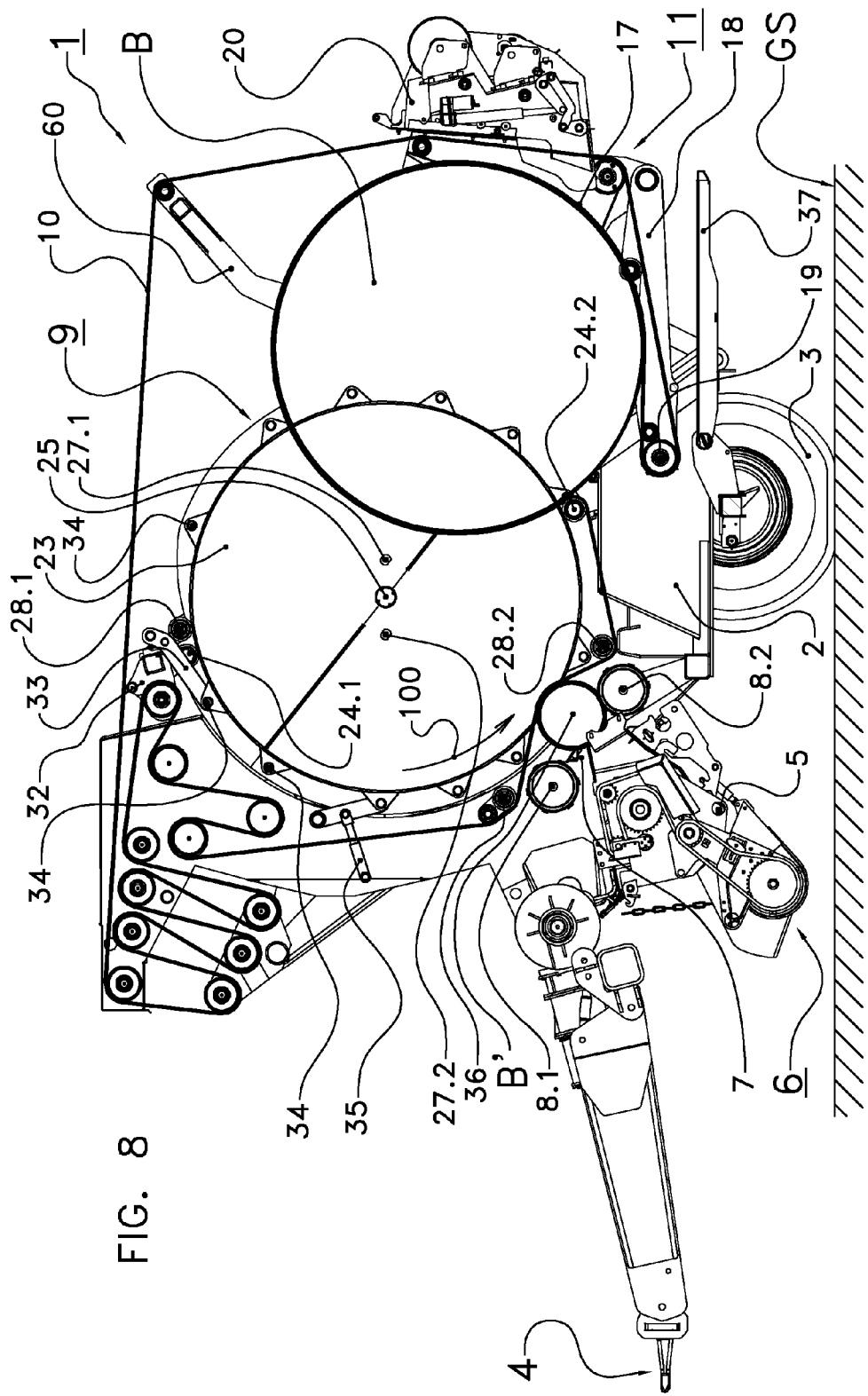
Figure 9:
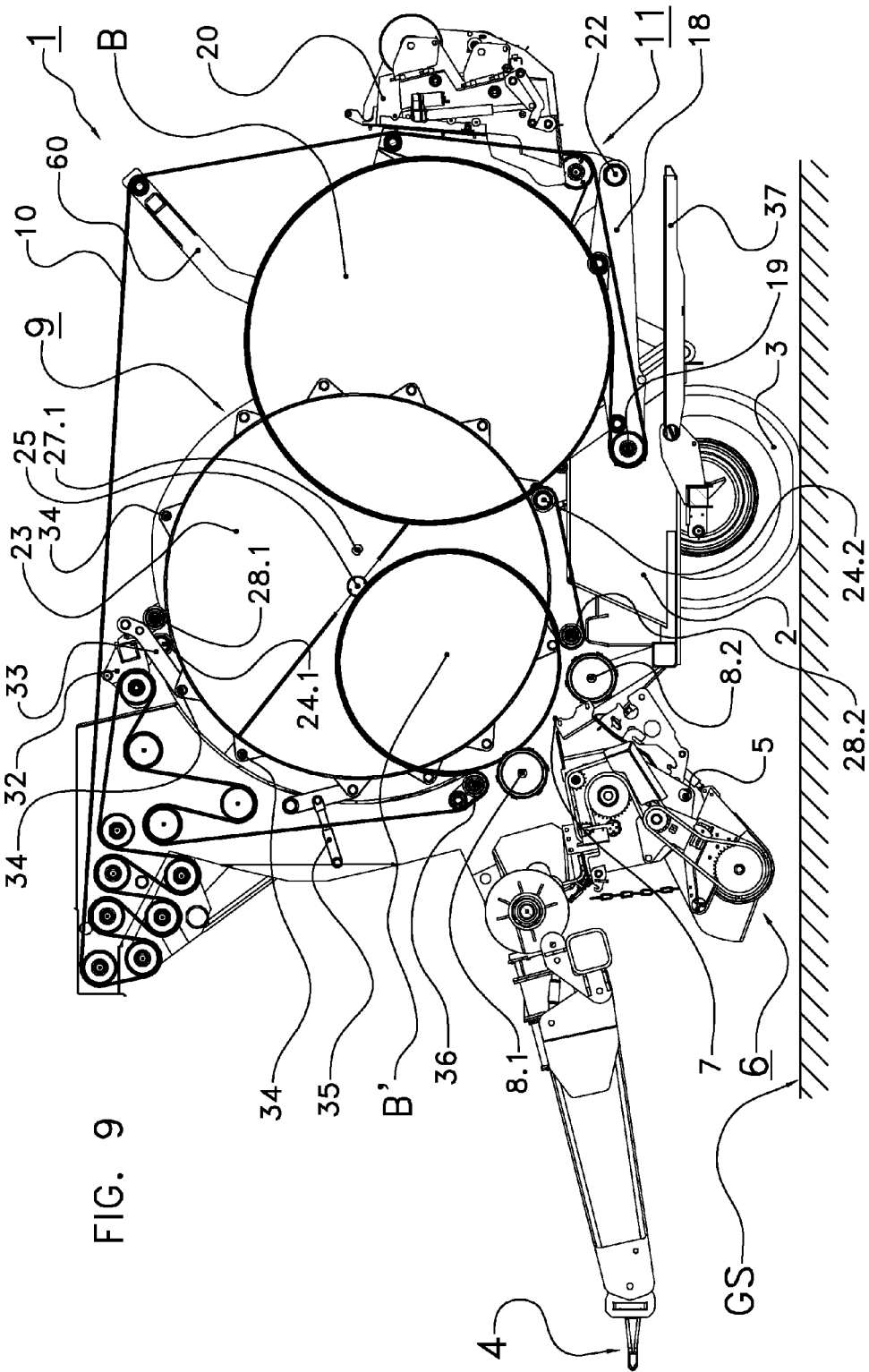
Figure 10:
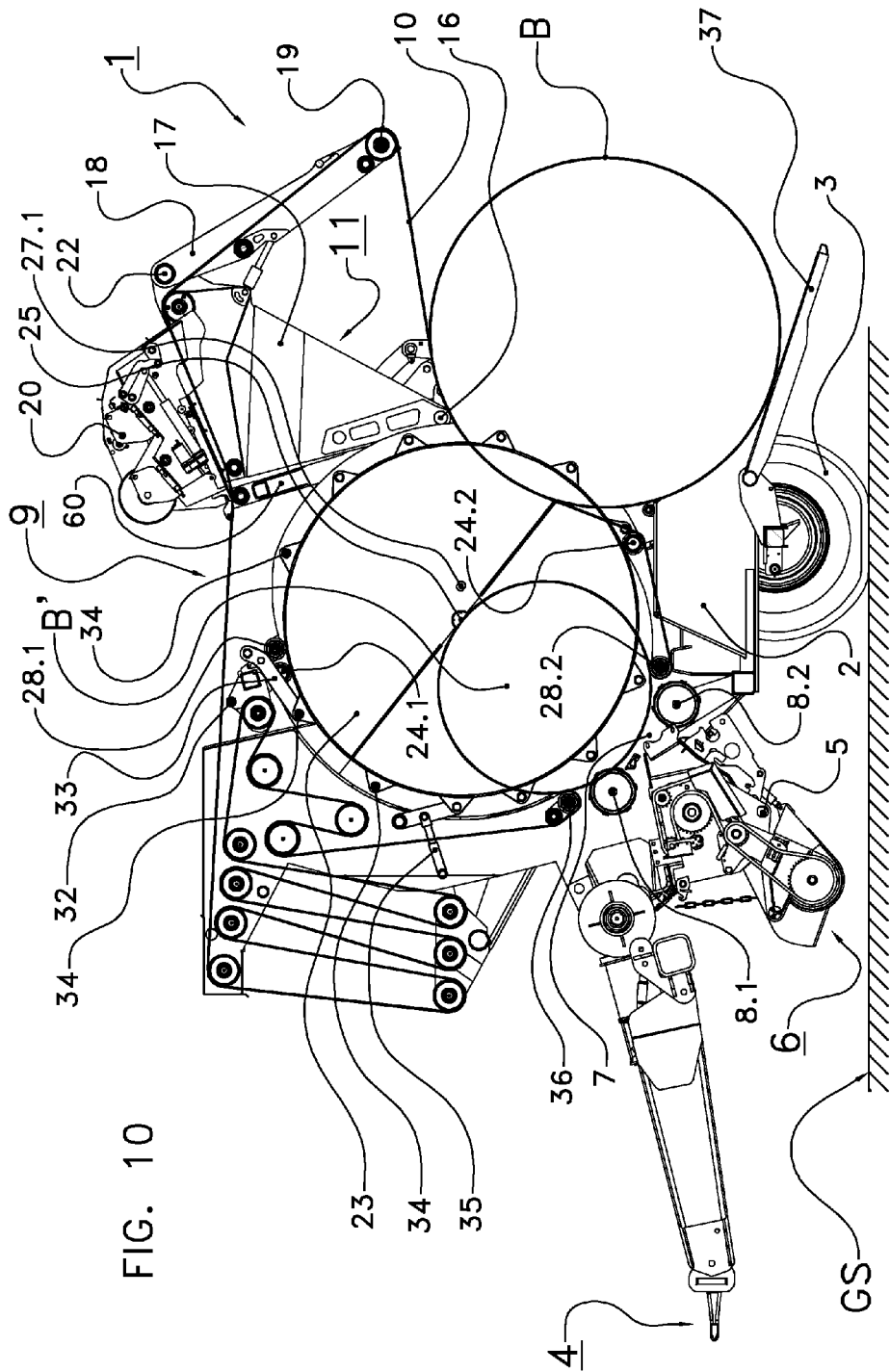
Figure 11:
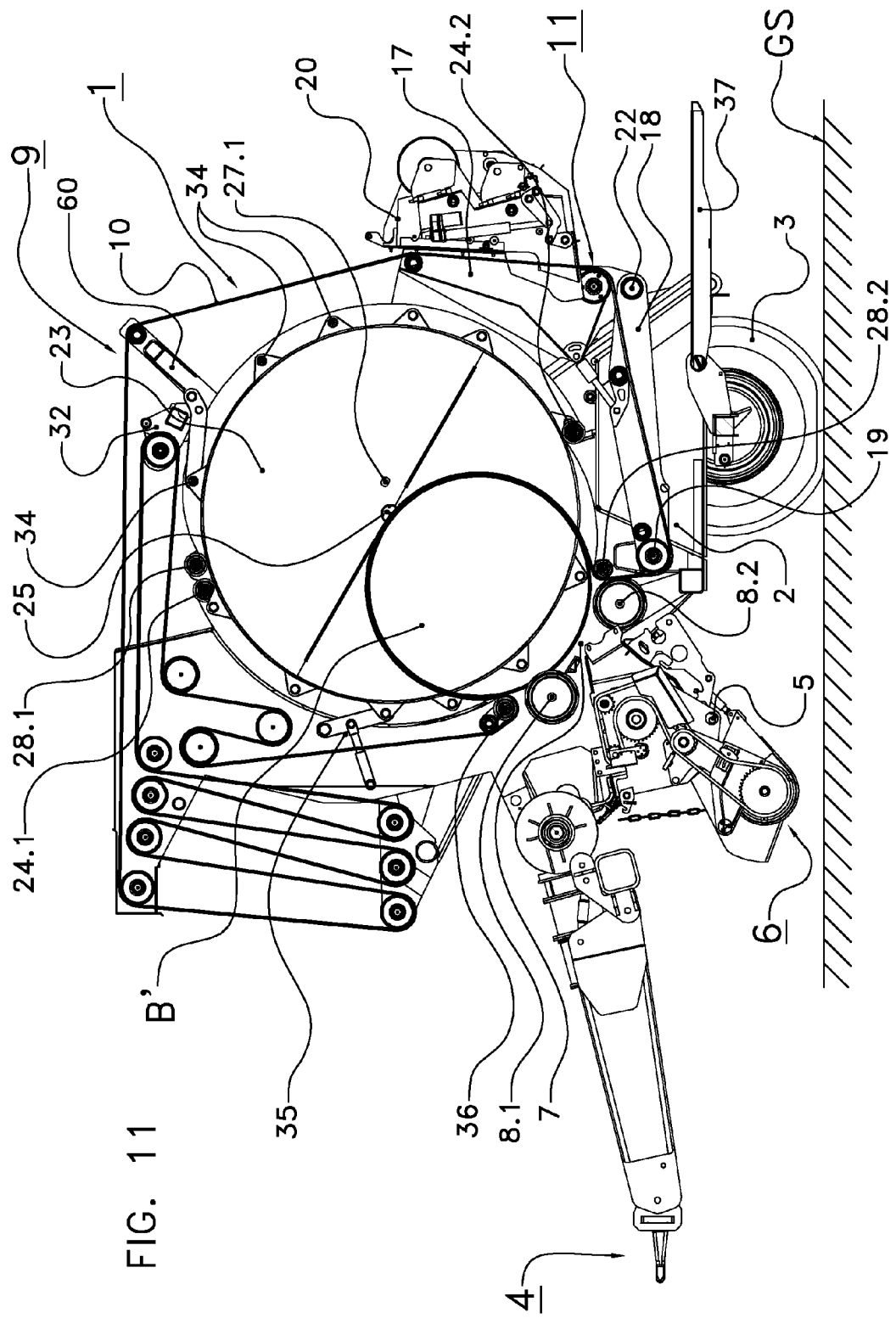
Figure 12:
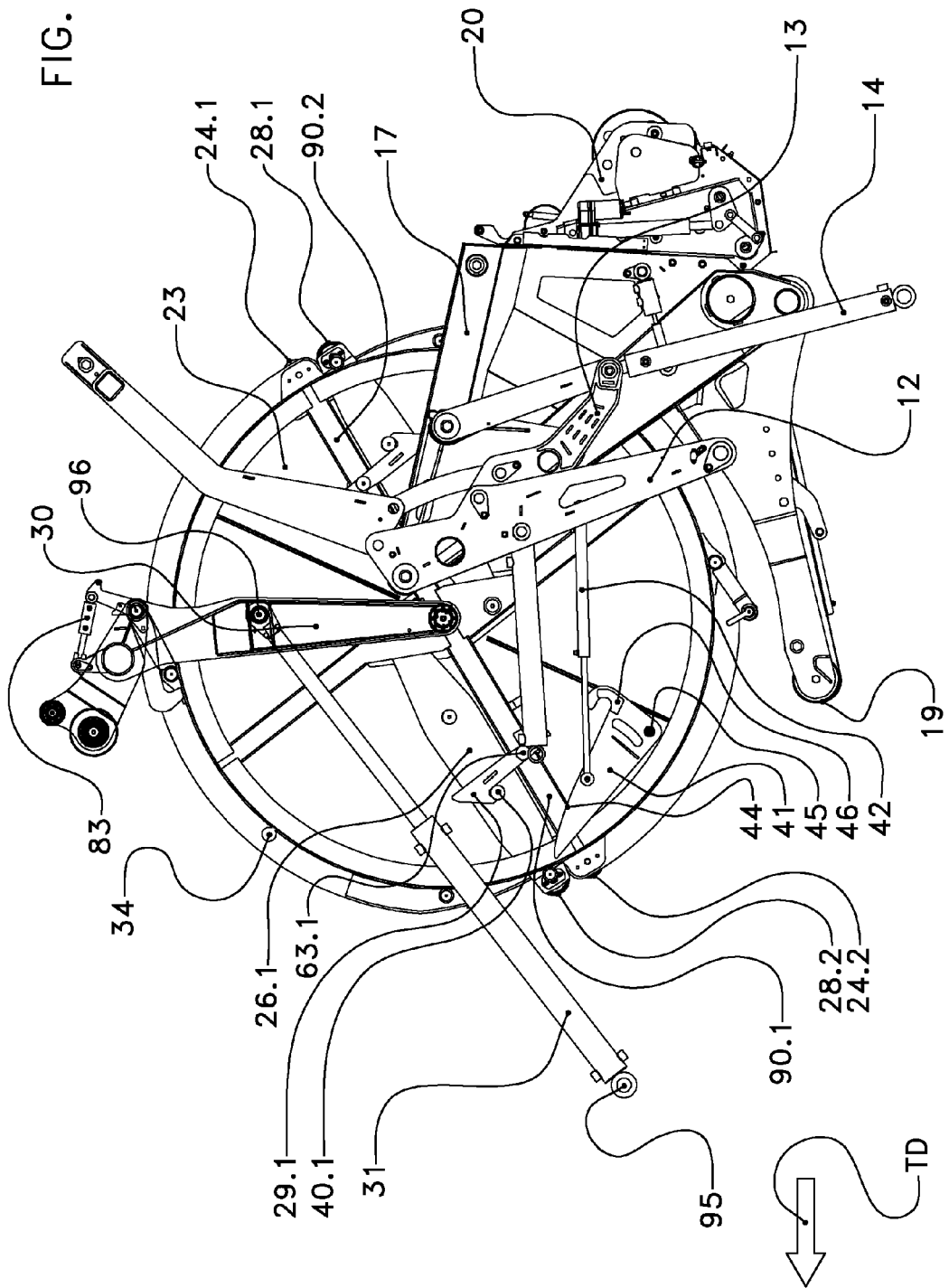
Figure 13:
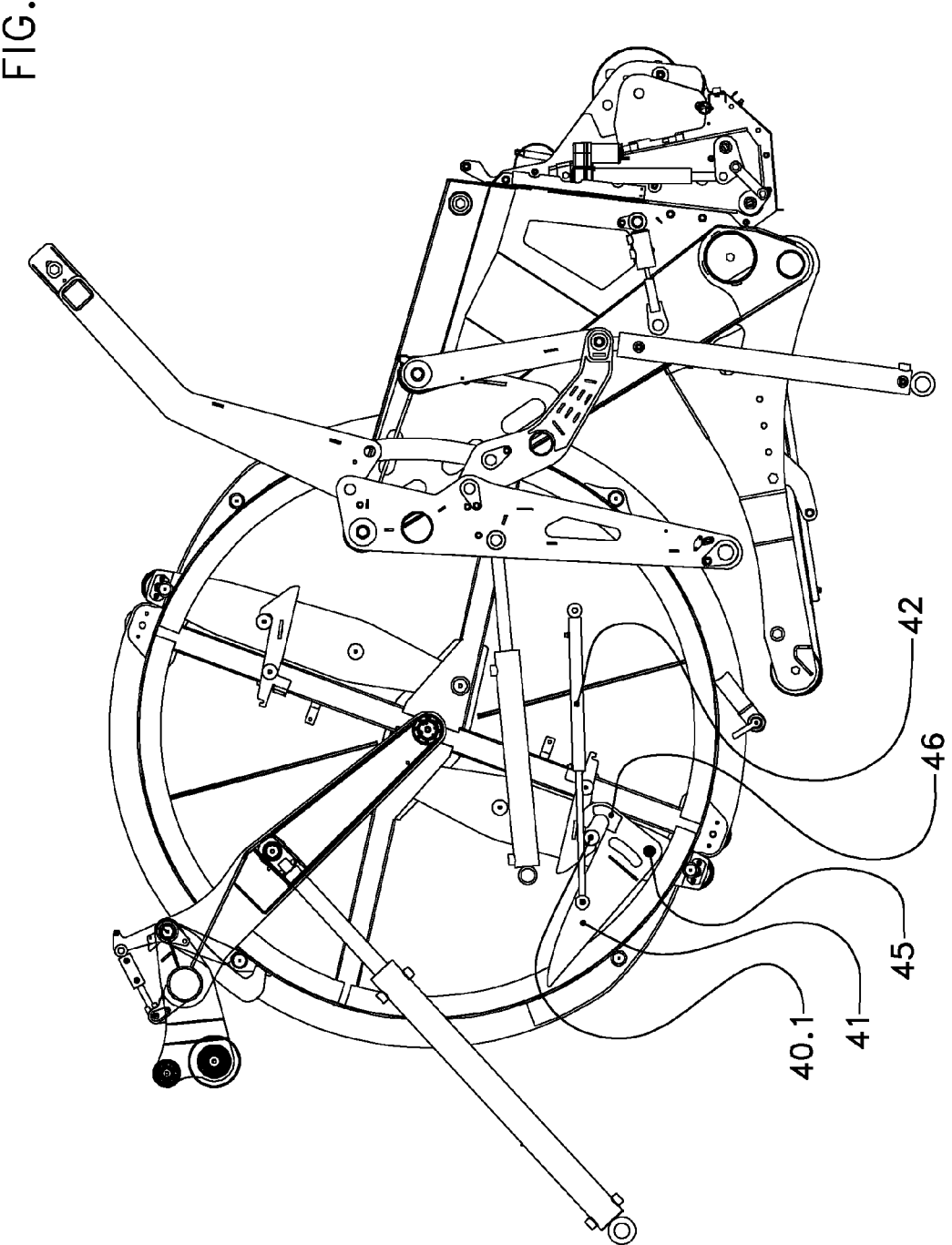
Figure 14:
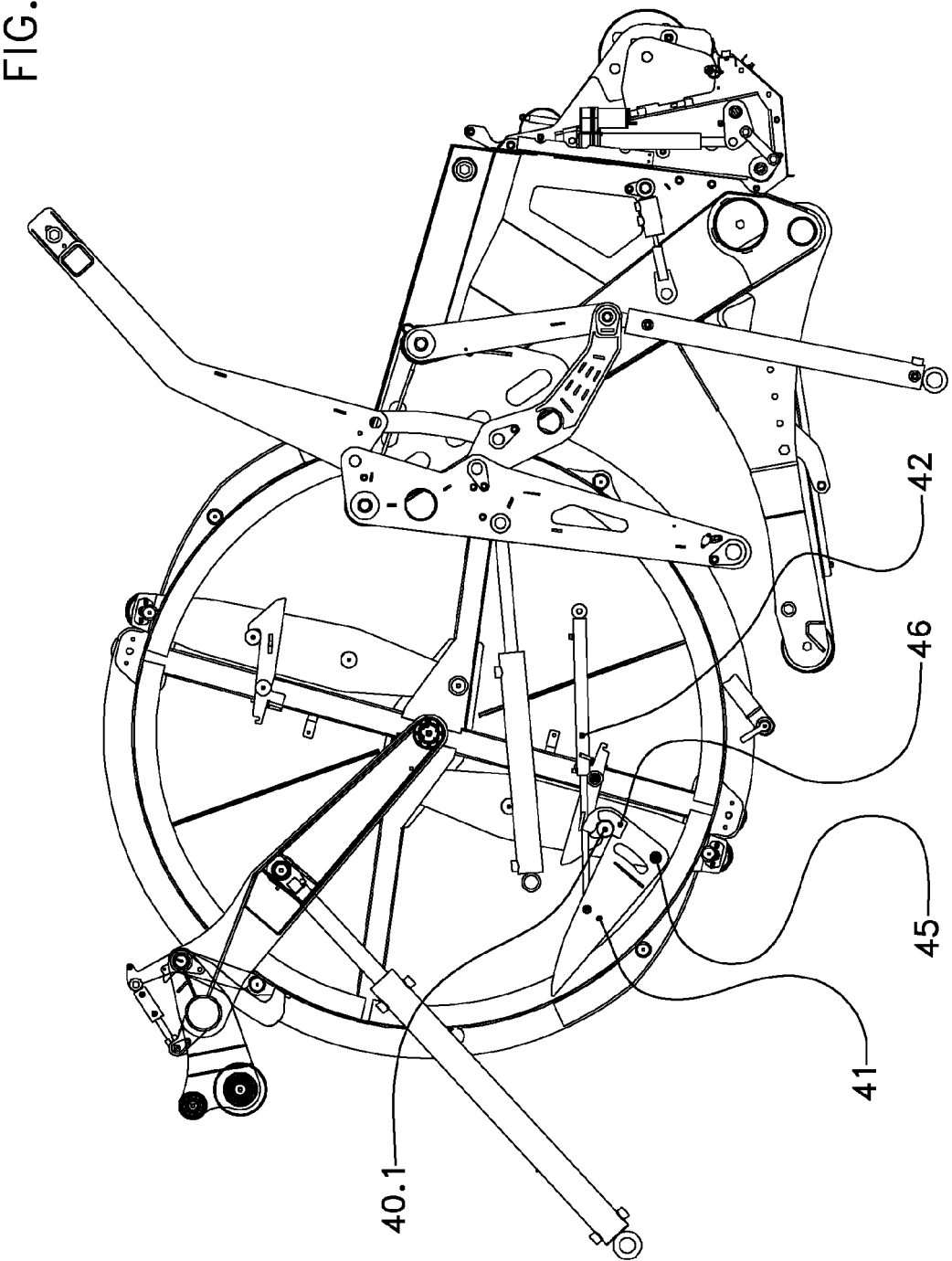
Figure 15:
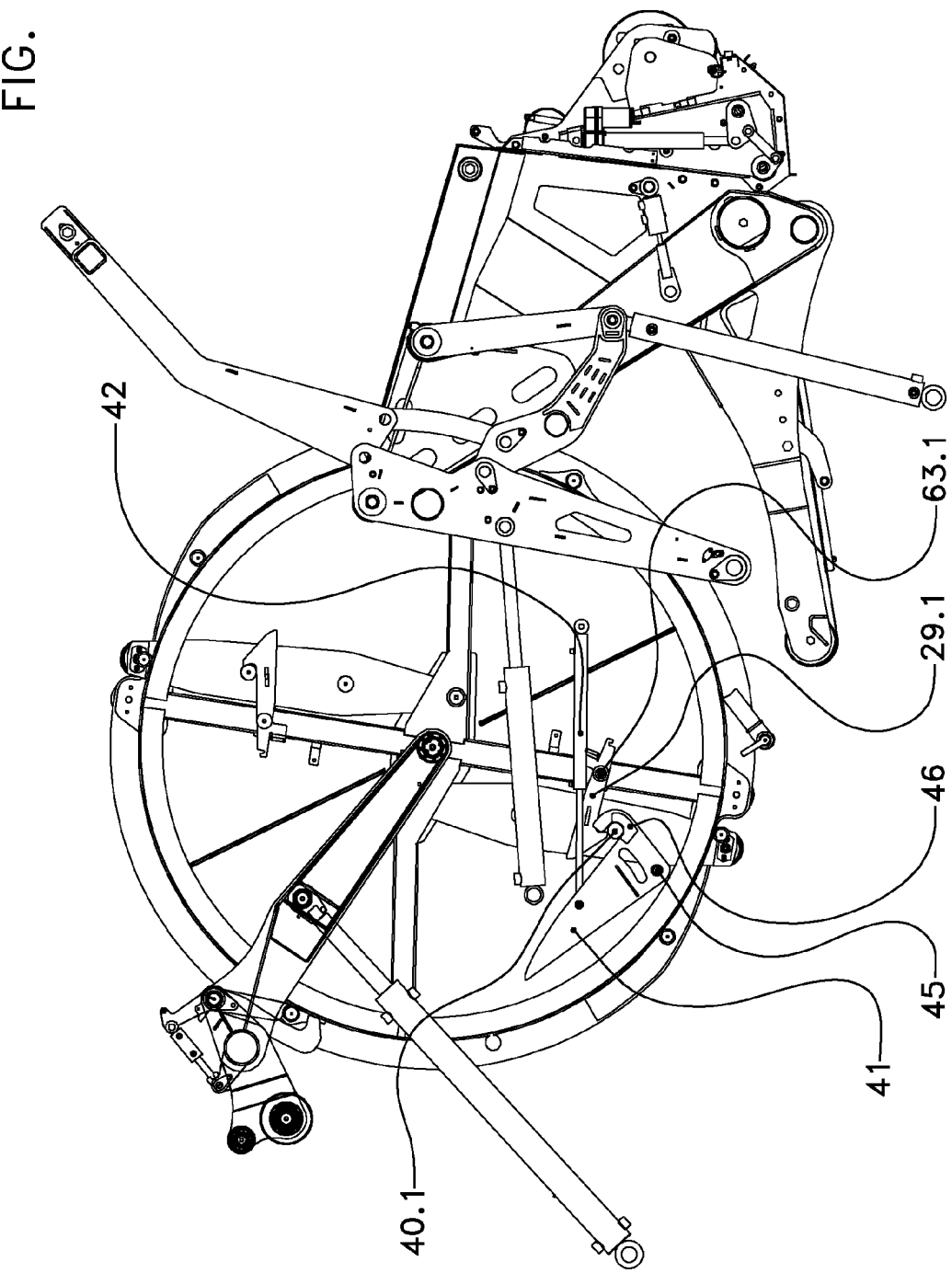
Figure 16:
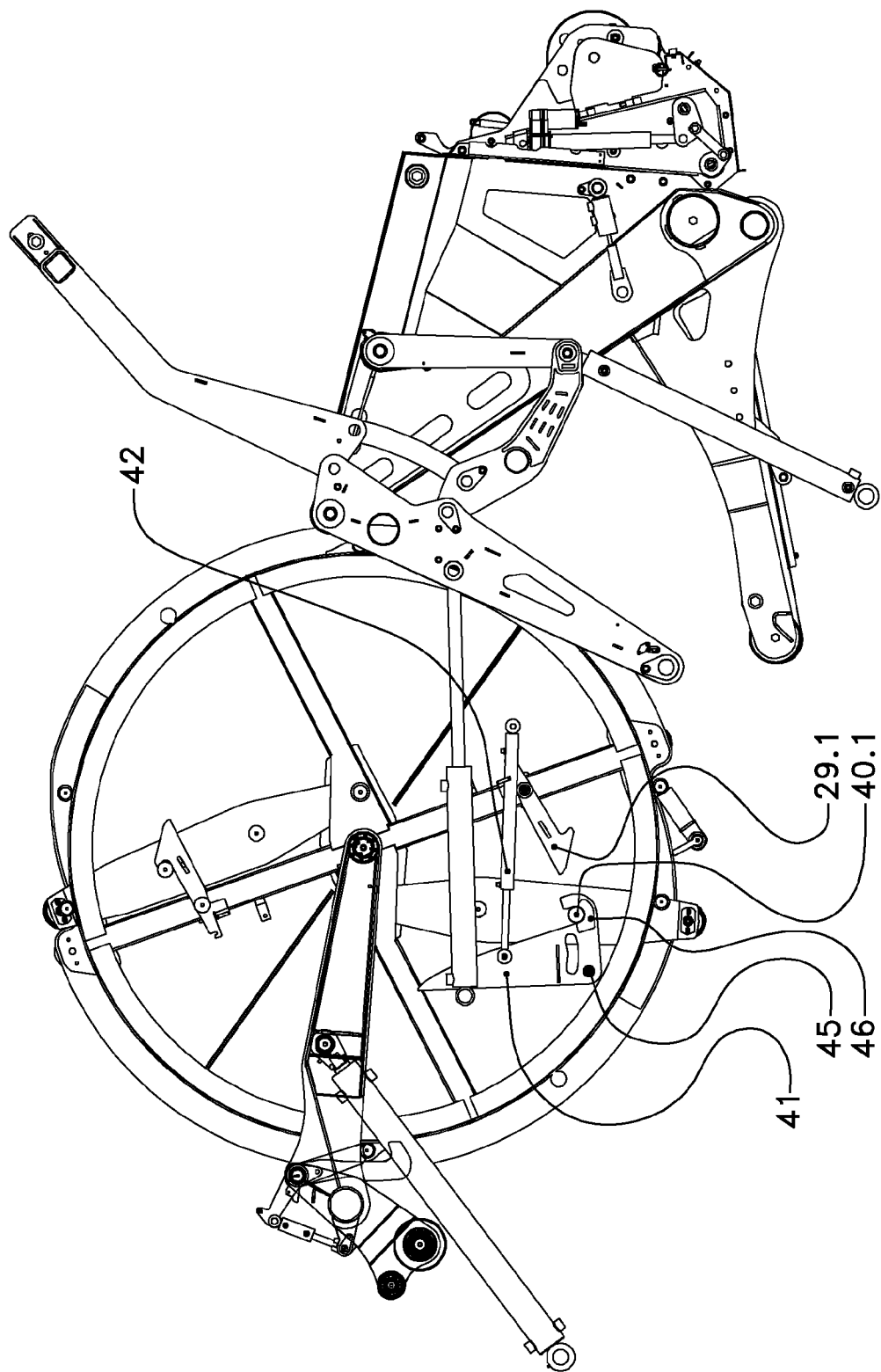
Figure 17:
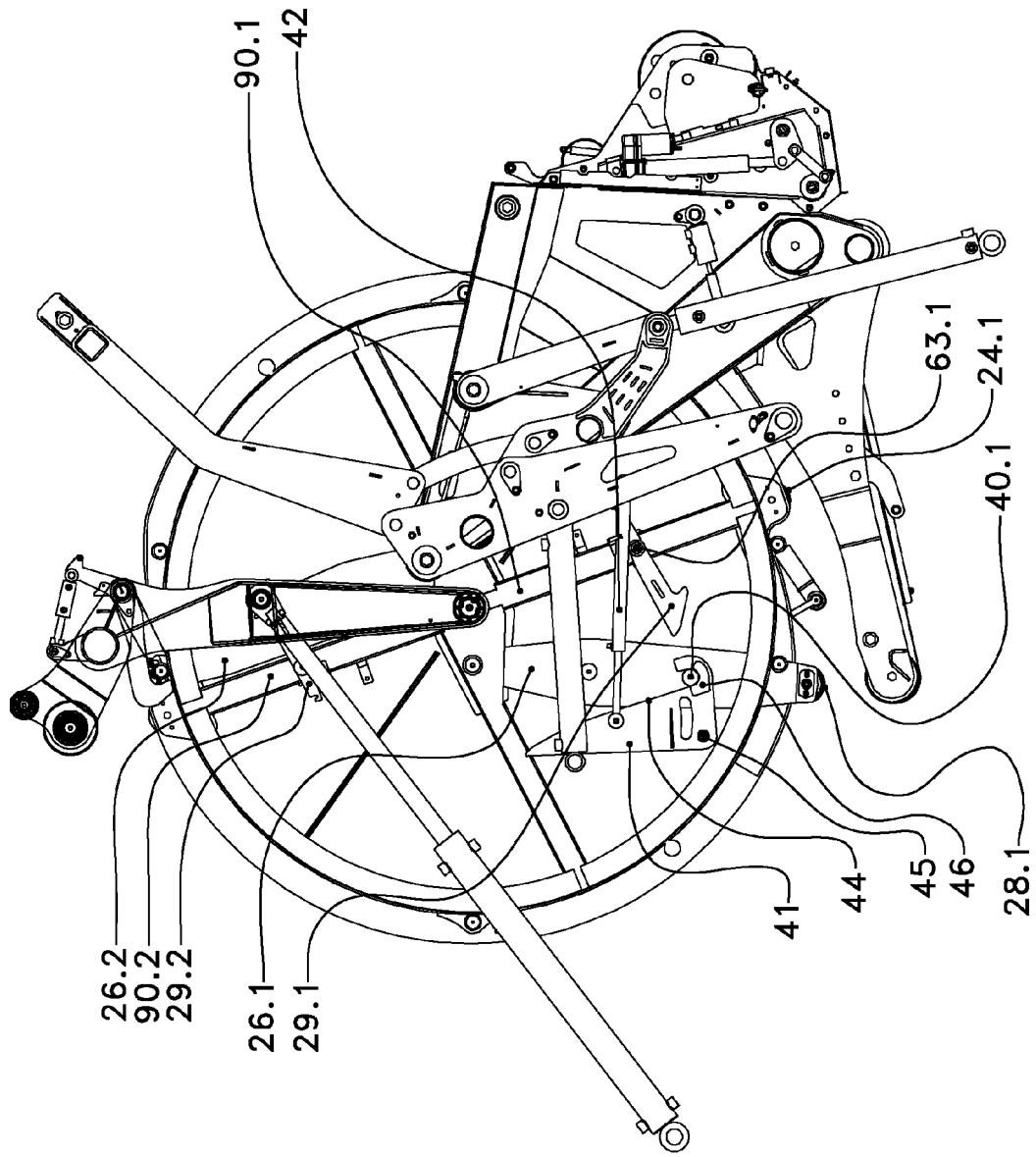
Figure 18:
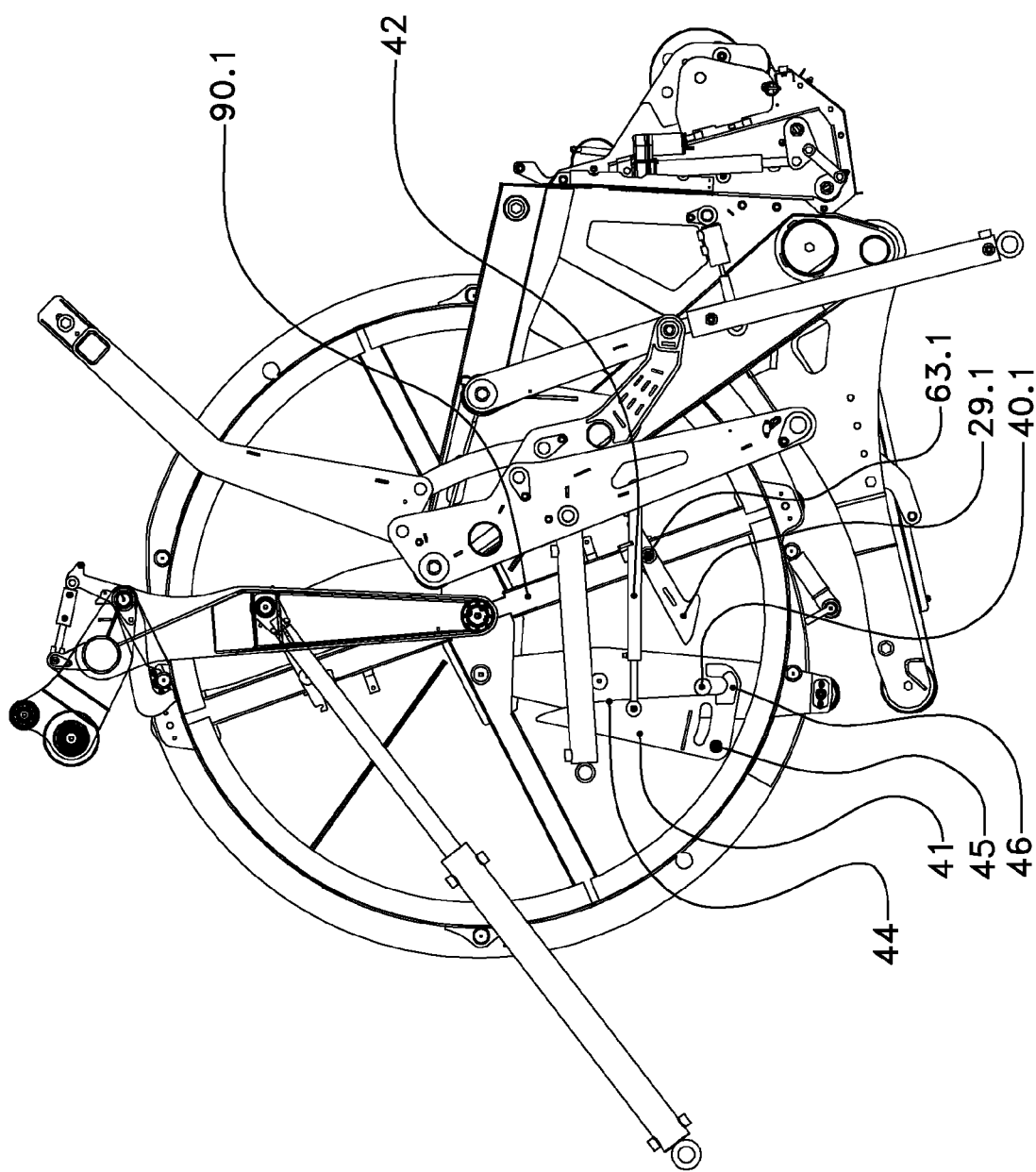
Figure 19:
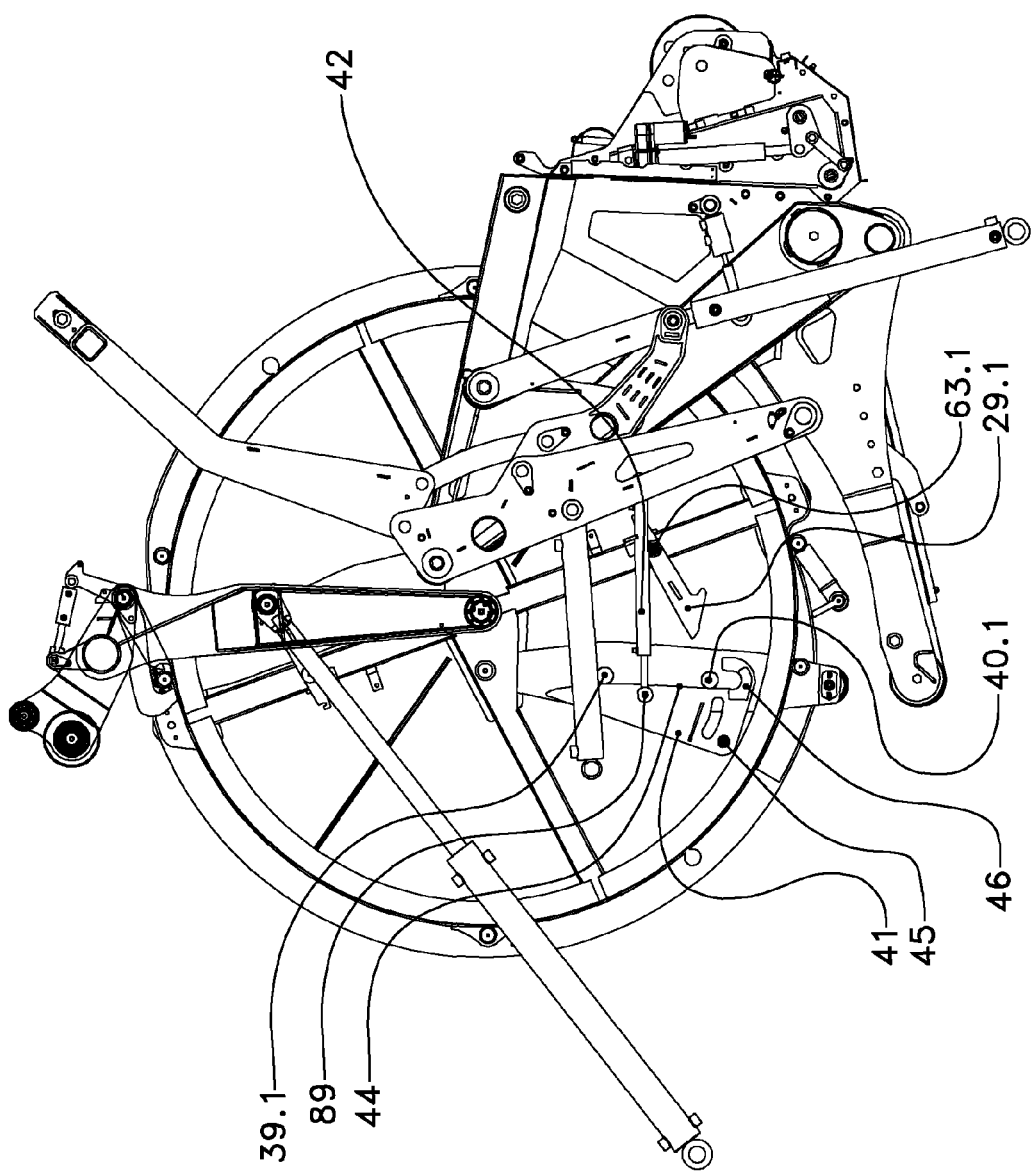
Figure 20:
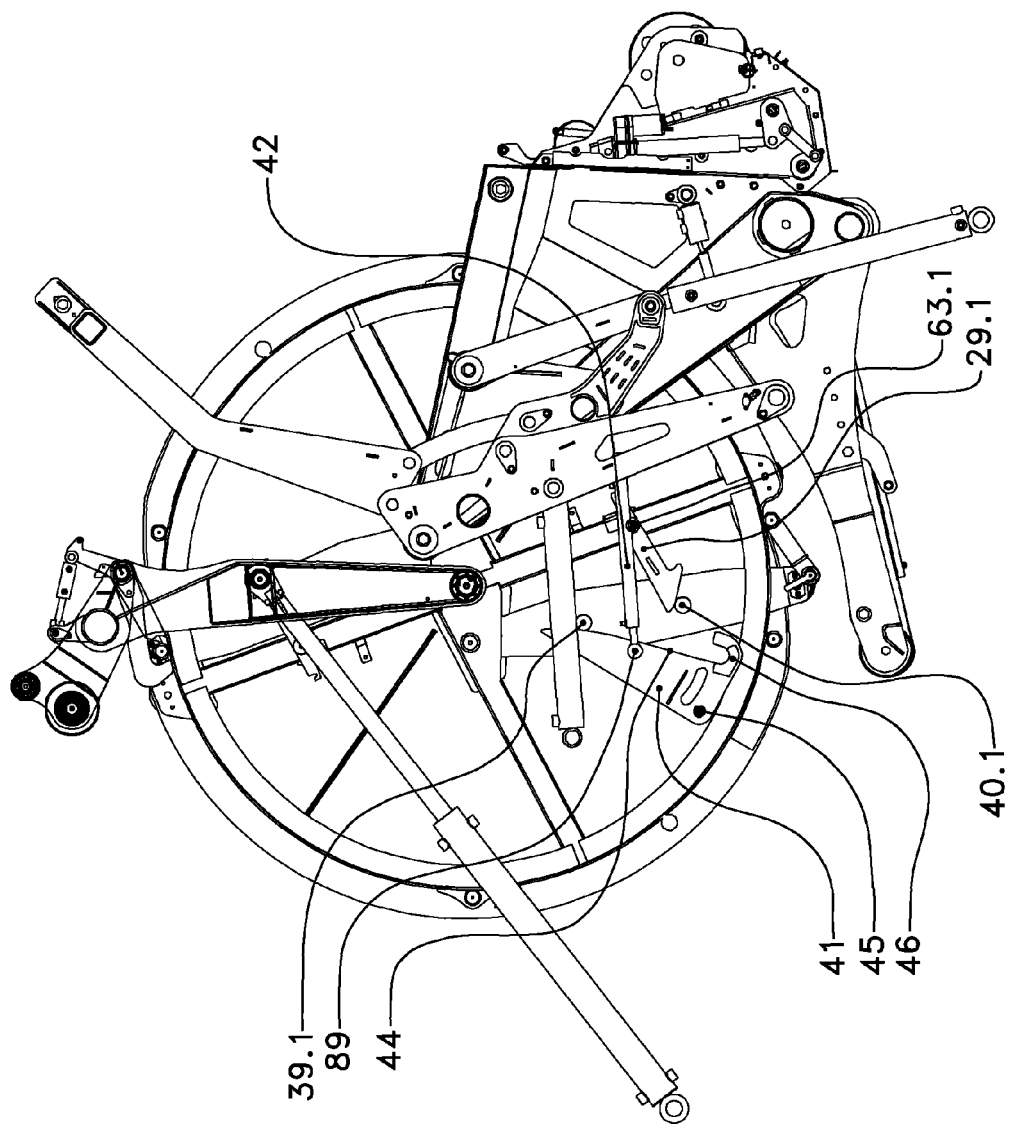
Figure 21:
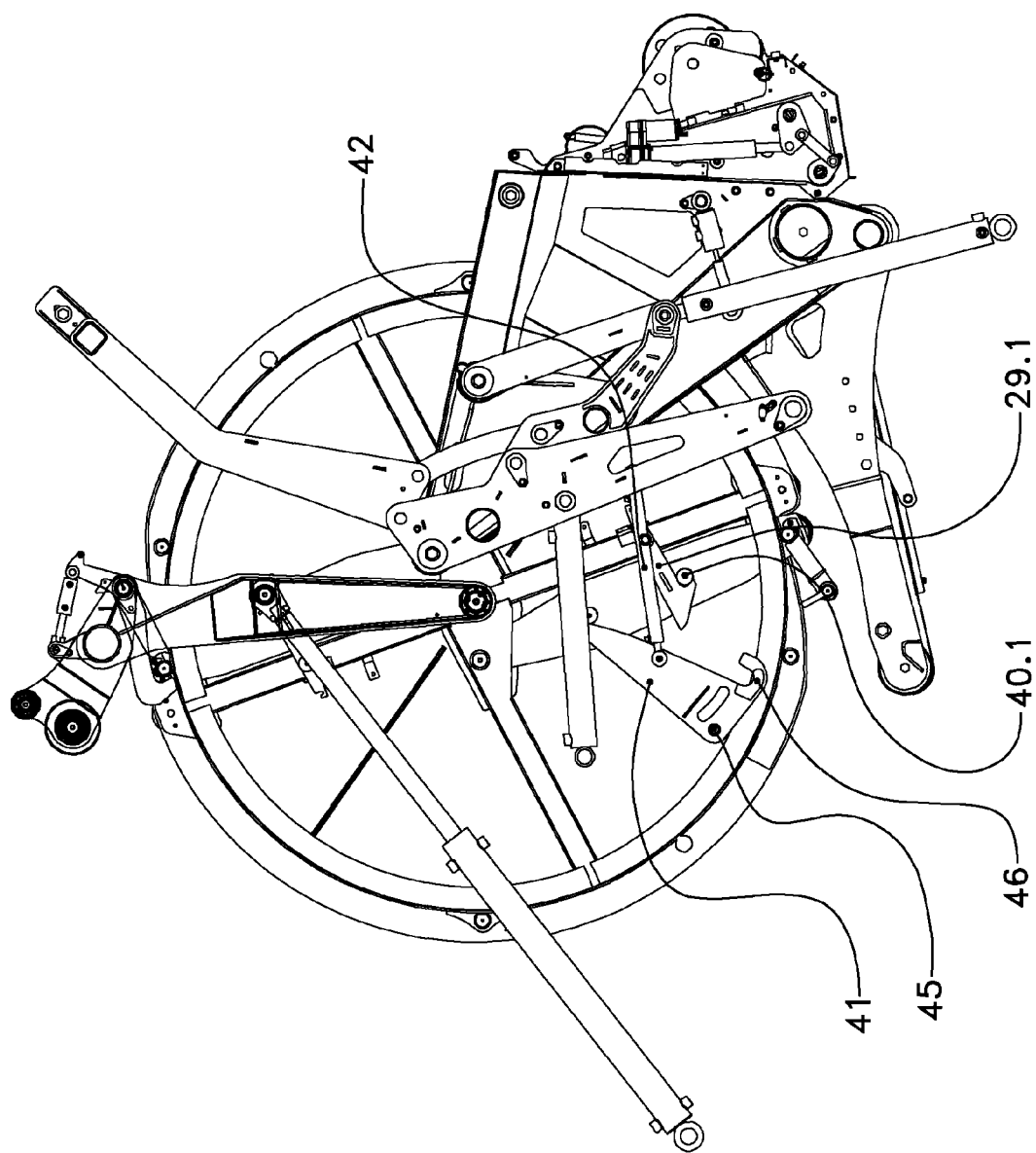
Figure 22:
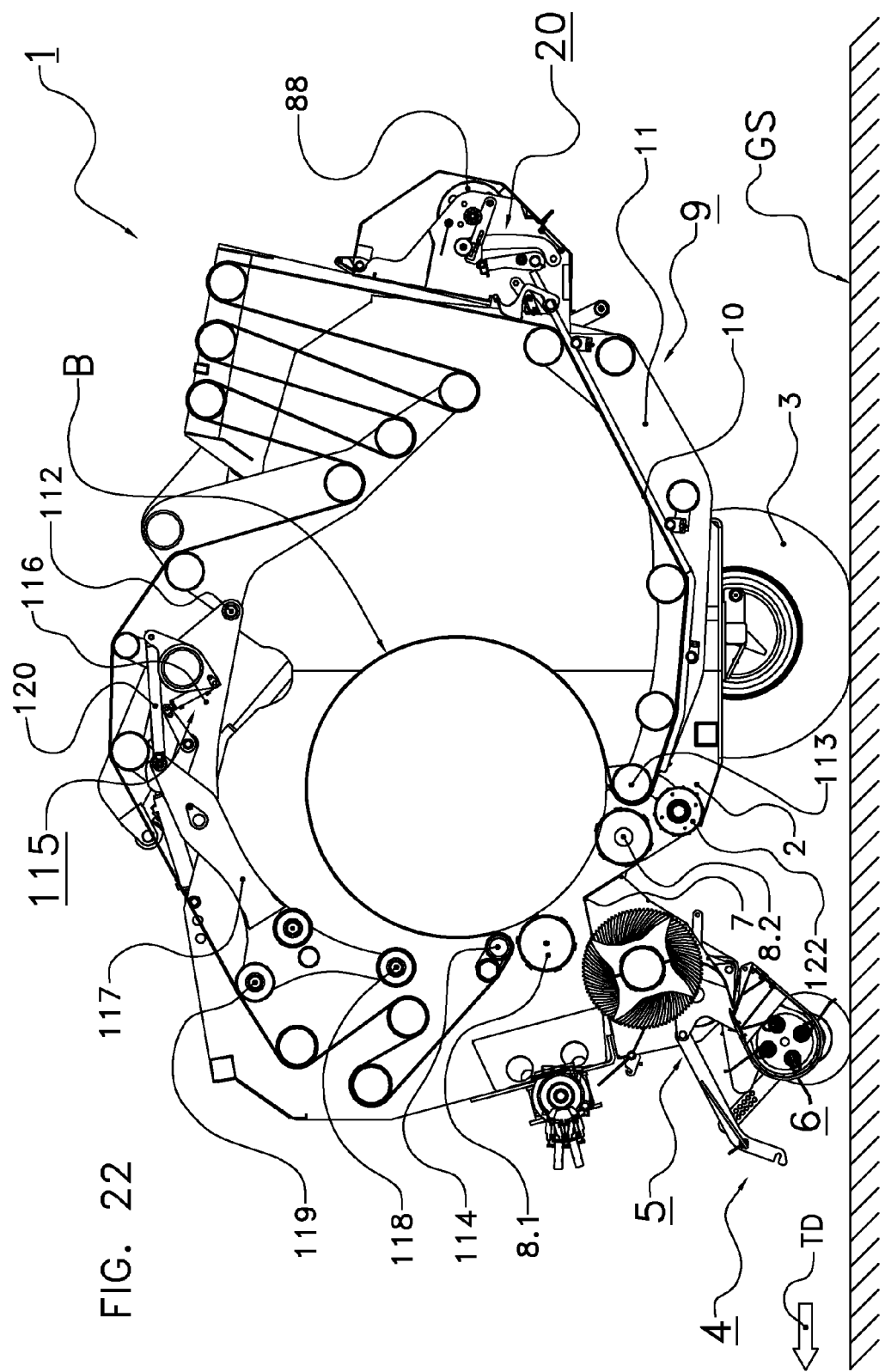
Figure 23:
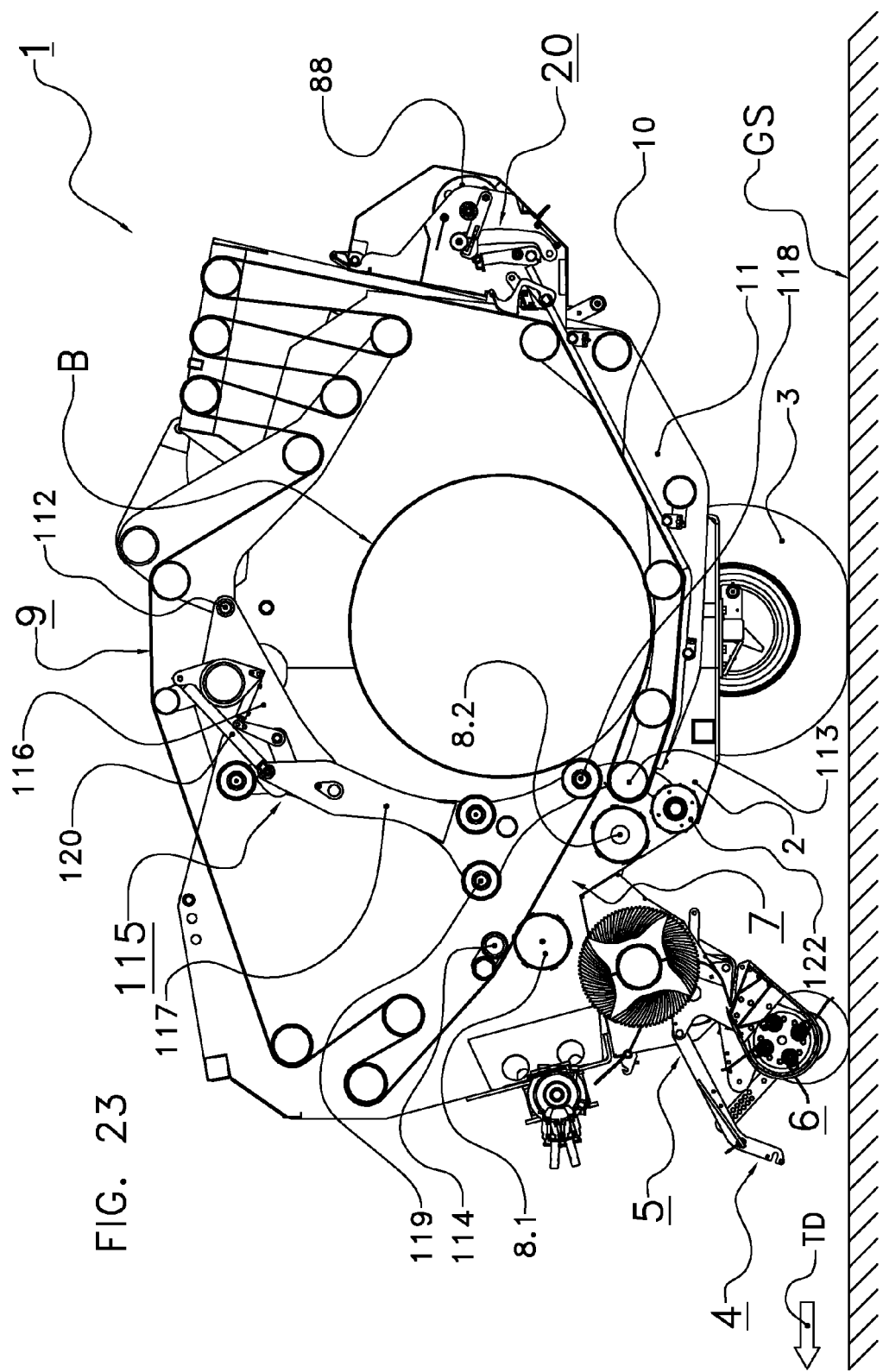
Figure 24:
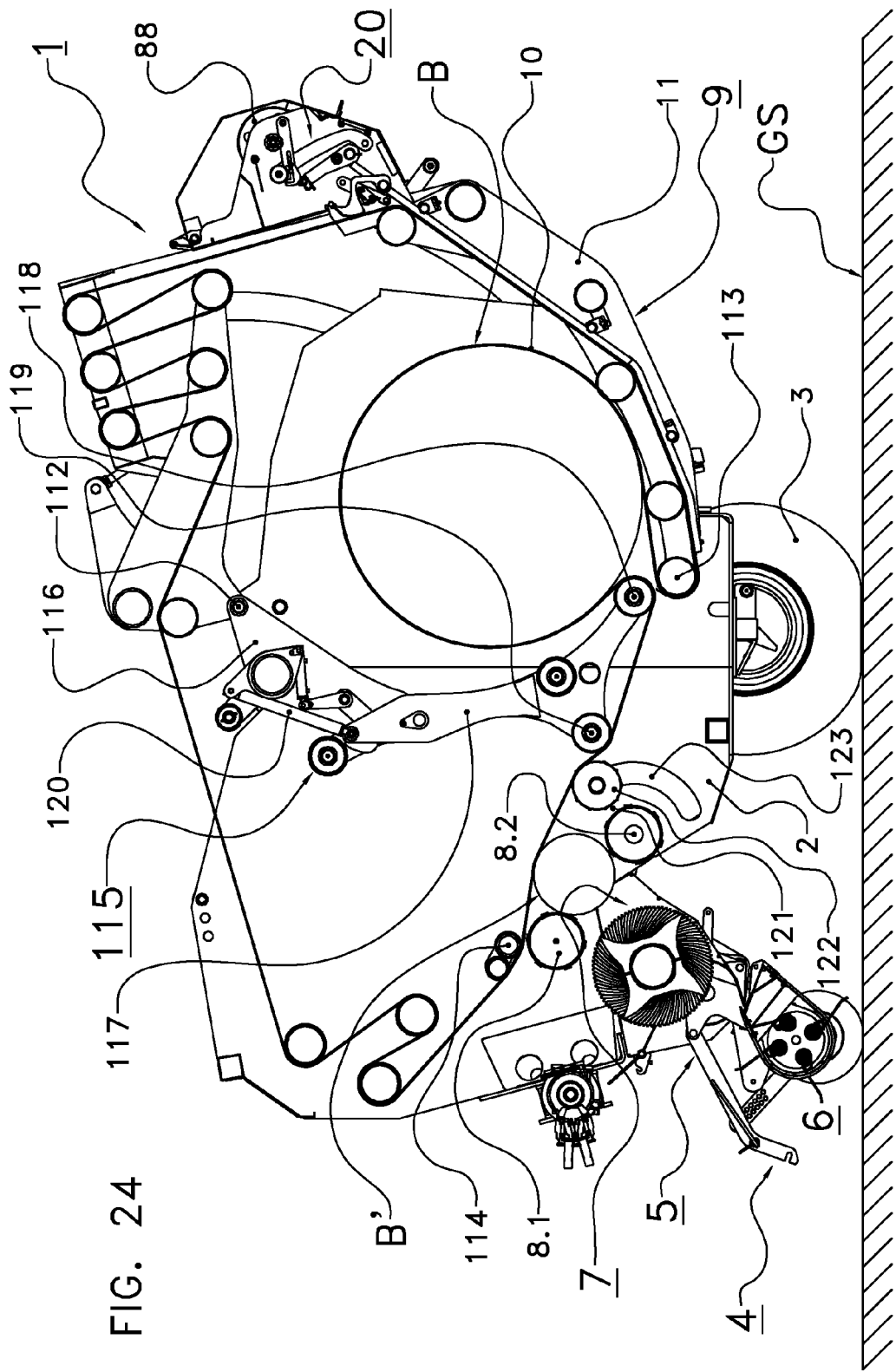
Figure 25:
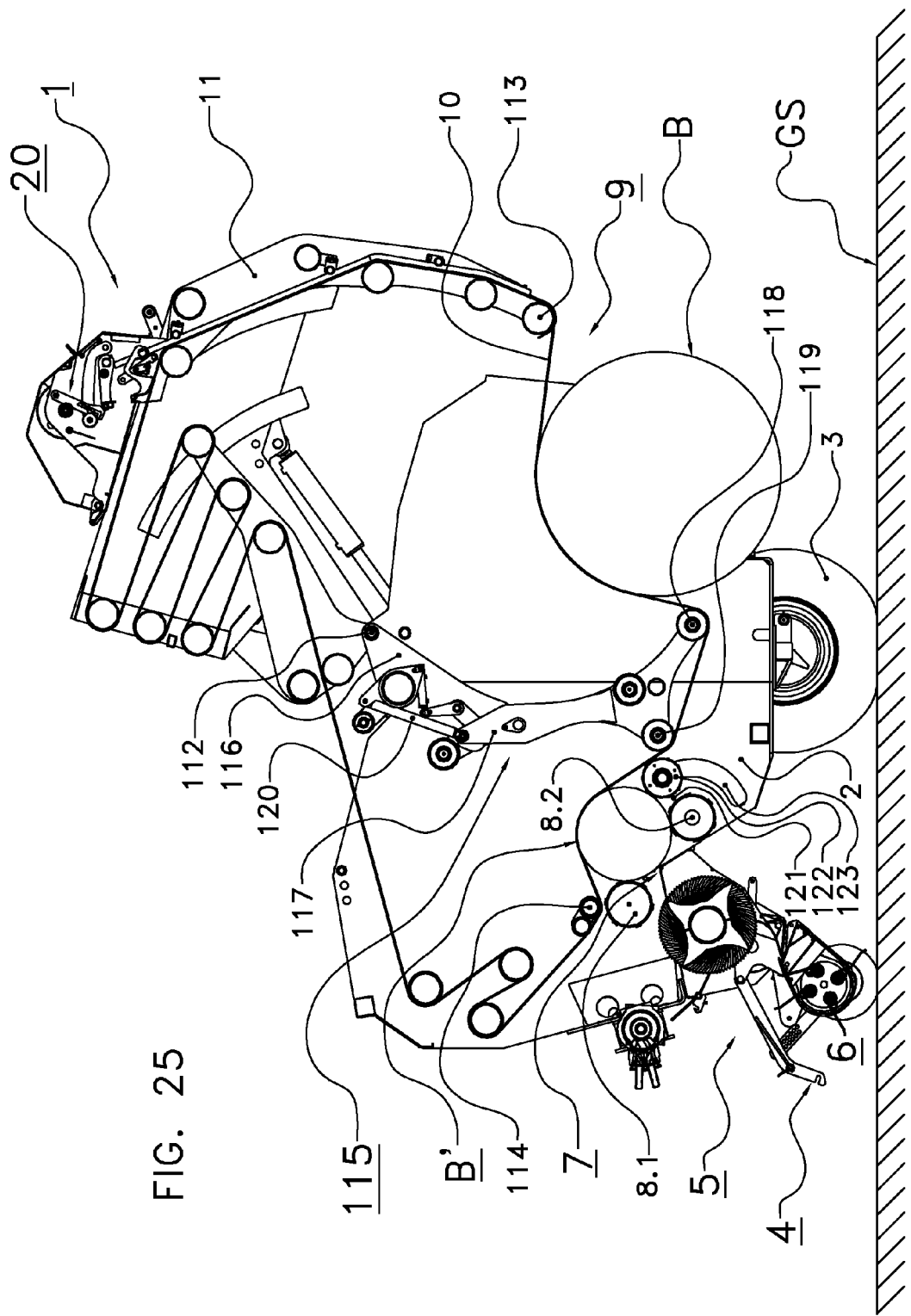
Figure 26:
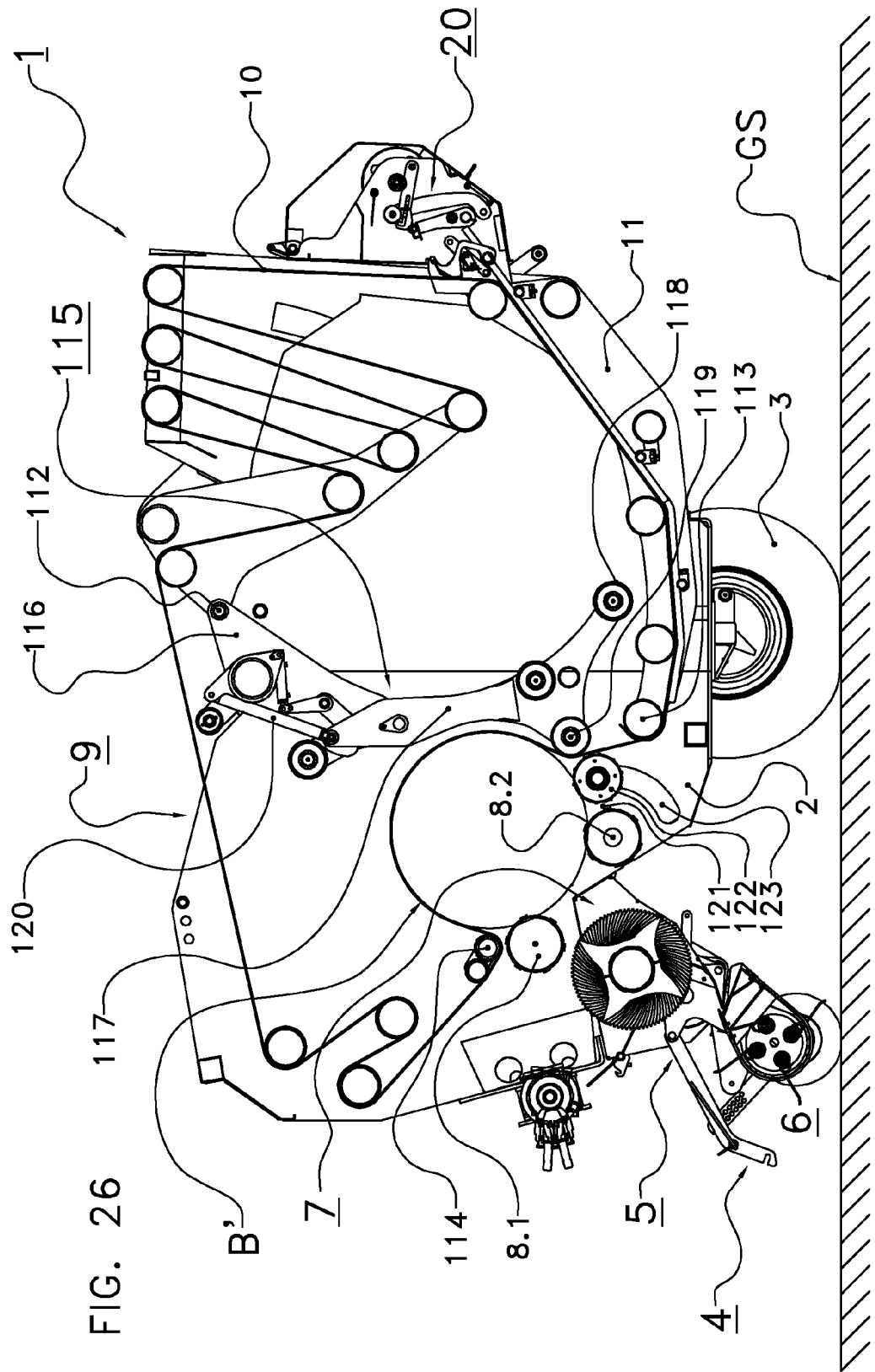
Figure 27:
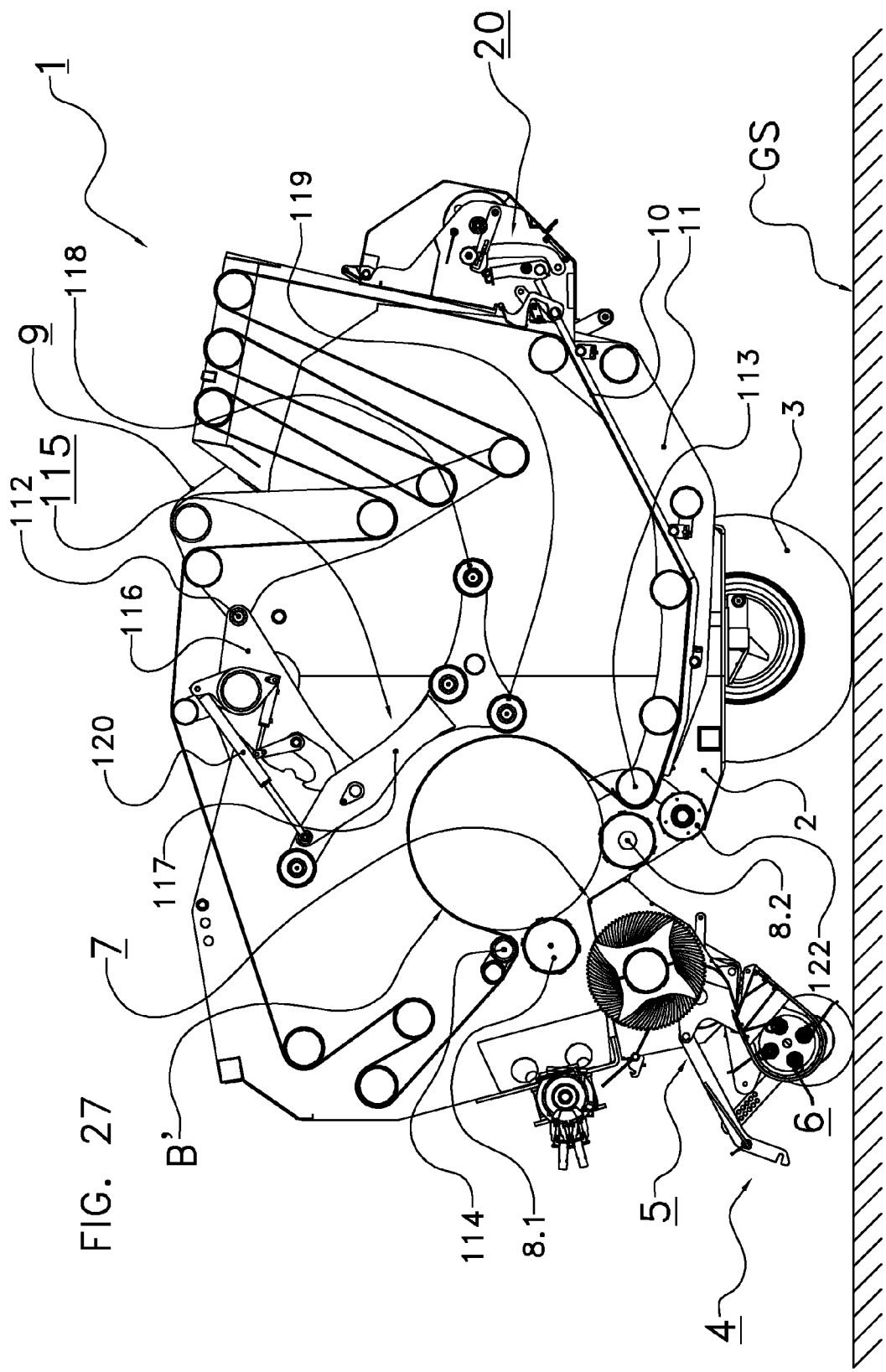
Figure 28:
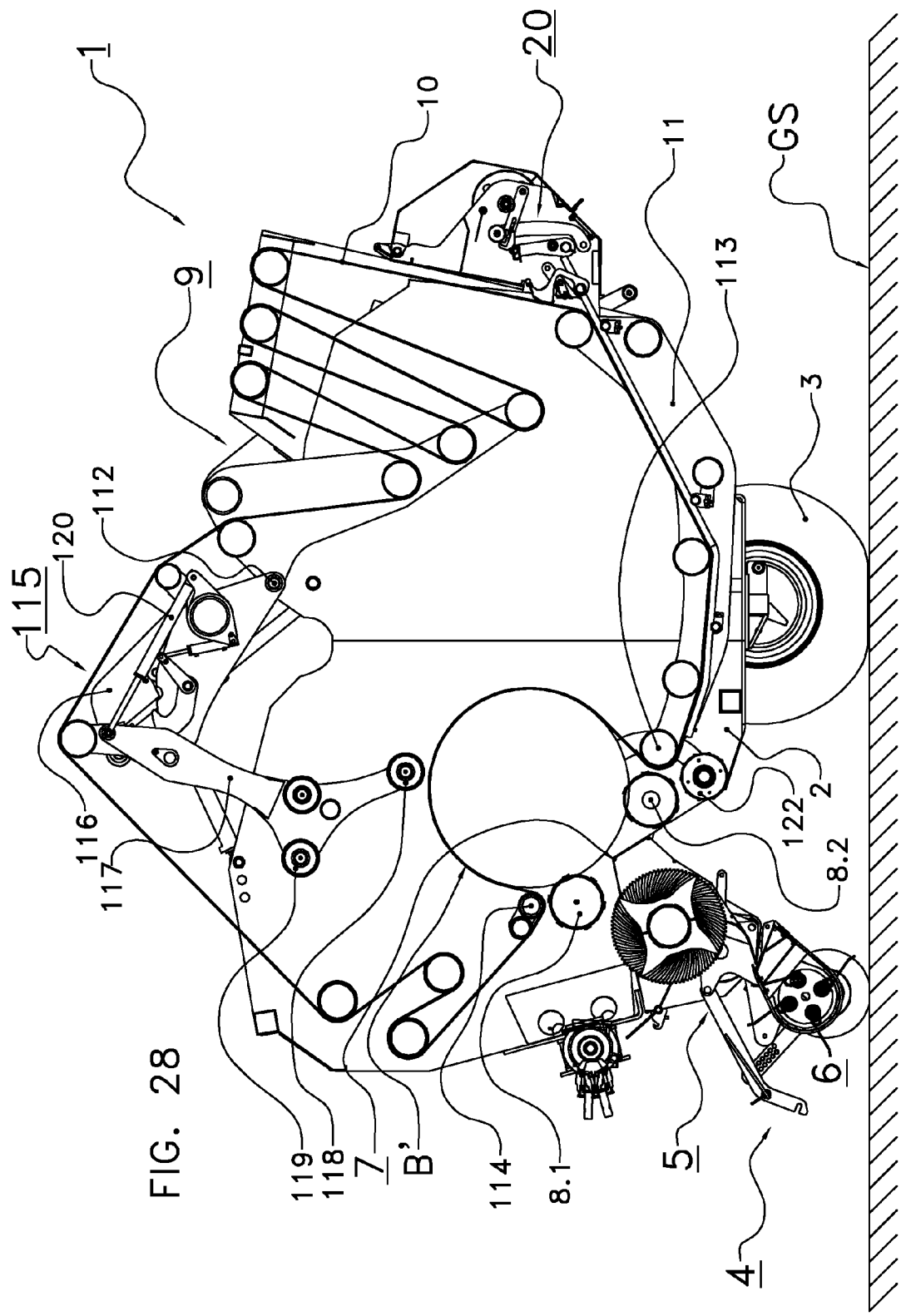
Figure 29:
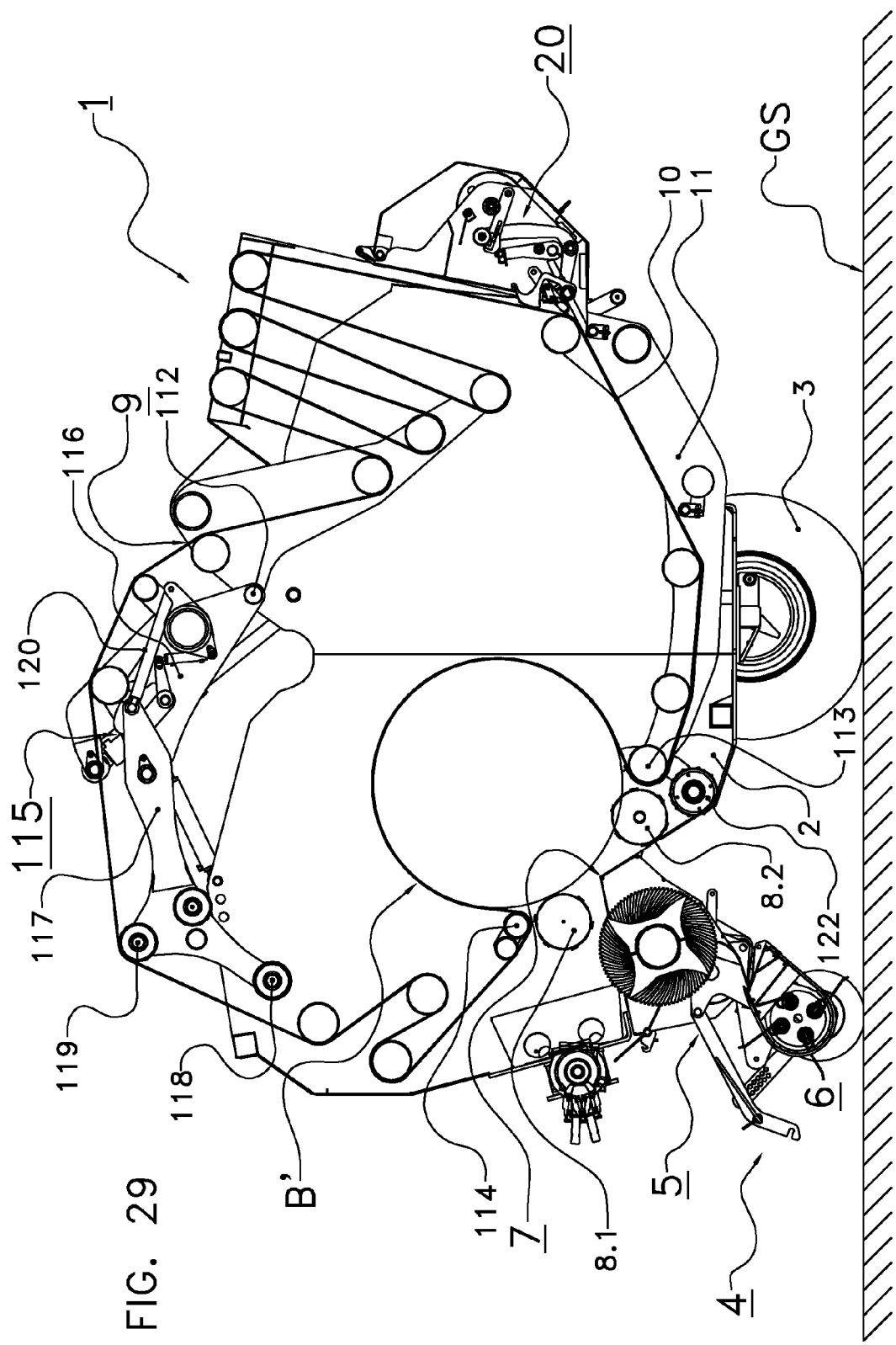

FIG. 8 shows the bale forming apparatus of FIG. 7 with the pivotal guiding roller being disconnected from the pushing roller and moved away from the pushing roller into the guiding position and the pushing roller being rotated into the pushing end position and the bale supporting construction in the bale supporting position and the pivotal guiding roller in the guiding position contributing to form a bale forming chamber in which the formation of a new bale in the bale forming chamber adjacent to the outlet starts;

FIG. 9 shows the bale forming apparatus of FIG. 8 with the new bale increasing and the old bale still on the bale supporting construction being in the bale supporting position;

FIG. 10 shows the bale forming apparatus of FIG. 9 with the bale supporting construction in the bale ejecting position;

FIG. 11 shows the bale forming apparatus of FIG. 10 after having ejected the bale and the bale supporting construction nearly being pivoted back into the bale receiving position;

FIG. 12 shows in more detail the pushing roller and the pivotal guiding roller being locked together by the locking hook before pushing a bale;

FIG. 13 shows the baler of FIG. 12 after having pushed the bale, the pushing roller and the pivotal guiding roller still being locked with each other;

FIG. 14 to FIG. 16 show the process of pivoting the pivotal guiding roller into the guiding position and releasing it from the pushing roller and of pivoting the tailgate into the bale supporting position;

FIG. 17 to FIG. 21 show the process of pivoting the pivotal guiding roller back into the pushing position and connecting it with the pushing roller while the bale supporting construction is in the bale receiving position;

FIG. 22 shows the bale forming apparatus comprising a pivotal pushing arm with a completed bale and the bale supporting construction in the bale receiving position before the bale has been pushed onto the bale supporting construction and the bale pushing device in the pushing start position;

FIG. 23 shows the bale forming apparatus of FIG. 22 with the bale pushed onto the bale supporting construction and the bale pushing device being in an intermediate position between the pushing start position and the pushing end position;

FIG. 24 shows the bale forming apparatus of FIG. 23 with the bale supporting construction pivoted into the bale supporting position and the bale pushing device in the pushing end position;

FIG. 25 shows the bale forming apparatus of FIG. 24 with the bale supporting construction pivoted into the bale ejecting position and the bale pushing device still in the pushing end position;

FIG. 26 shows the bale forming apparatus with the bale supporting construction while being pivoted back into the bale receiving position, the bale pushing device still in the pushing end position and a new bale increasing in the bale forming chamber;

FIG. 27 shows the bale forming apparatus of FIG. 26 with the bale supporting construction being nearly completely pivoted back into the bale receiving position and the bale pushing device being pivoted around the bale towards the parking position;

FIG. 28 shows the bale forming apparatus of FIG. 27 with the bale supporting construction in the bale receiving position and the bale pushing device further moved towards the parking position;

FIG. 29 shows the bale forming apparatus of FIG. 28 with the bale pushing device in the parking position.

DETAILED DESCRIPTION OF THE INVENTION

Figure 1:
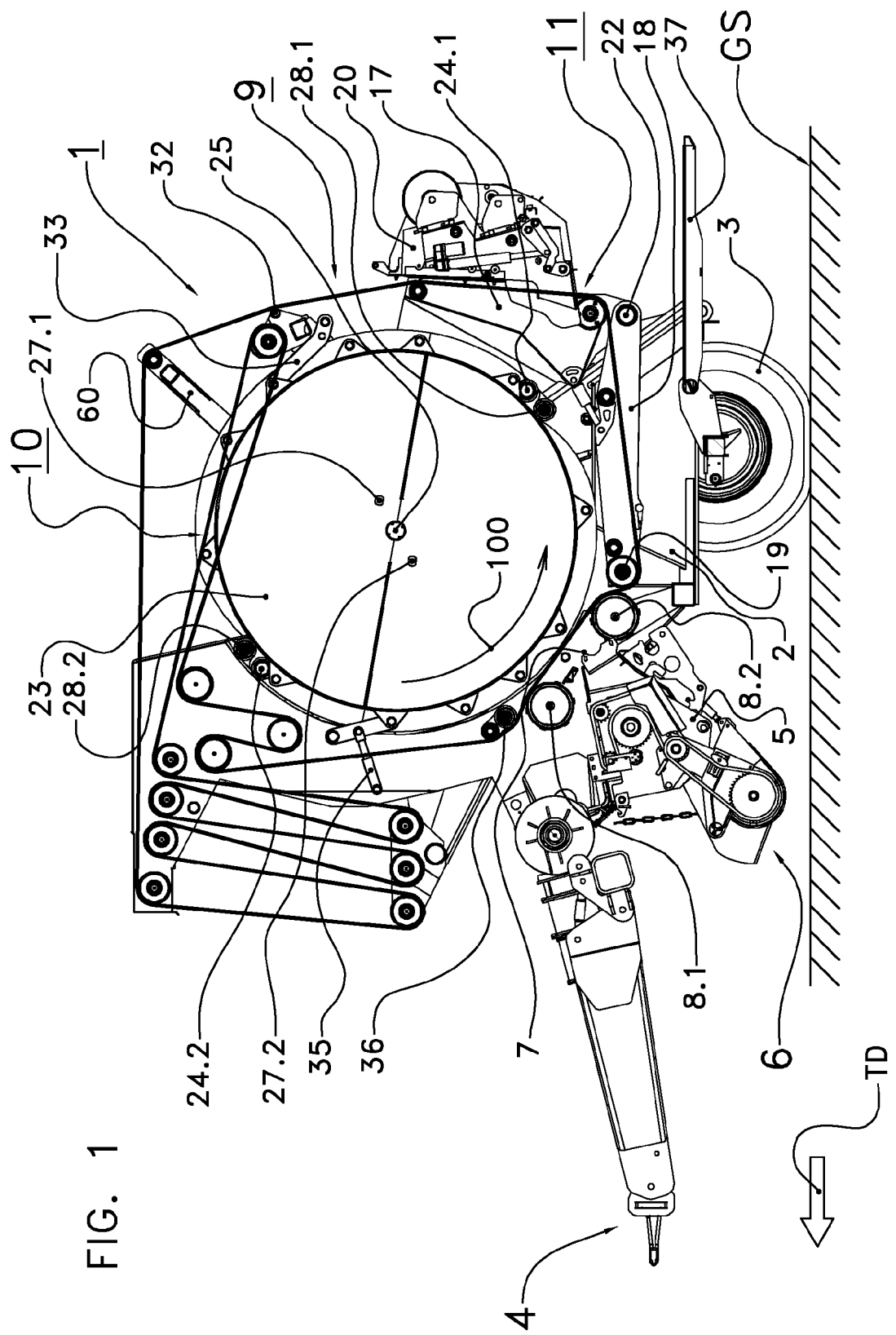
FIG. 1 shows a cross section of the bale forming apparatus with the bale supporting construction in the bale receiving position and without a bale.

FIG. 1 shows a bale forming apparatus, generally indicated with reference numeral 1. The bale forming apparatus 1 comprises a frame 2 which is supported by wheels 3. The bale forming apparatus 1 is configured to be connected at its front end 4 to a pulling vehicle, for instance to a tractor. The bale forming apparatus 1 is adapted for being pulled in a travelling direction TD, that is in FIG. 1 from right to left.

The bale forming apparatus 1 comprises an intake device 5 to take in crop material, such as silage, grass, hay, from a ground surface GS. The intake device 5 comprises an inlet 6 and an outlet 7. At opposite sides of the outlet 7 two stationary supporting rollers 8.1, 8.2 are provided. The rotating axes of these two supporting rollers 8.1, 8.2 are perpendicular to the drawing plane of FIG. 1. Via the inlet 6 crop material is taken from the ground surface GS and transported to the outlet 7. A drum provided at the inlet 6 may be provided with tines to facilitate the picking up of crop material. The tines can be mounted in a flexible manner such that they can adapt to the ground profile.

The frame 2 comprises a front housing part. A bale forming device 9 is arranged on the frame 2 to form bales of crop material. The bale forming device 9 comprises at least one endless belt 10 and a number of guiding rollers supporting the endless belt(s) 10. Preferably several belts 10 are arranged parallel to each other. The belt(s) 10 operate as the bale forming means. A tensioning device is provided to maintain tension in the belt(s) 10.

The back end of the bale forming apparatus 1 is provided with a tailgate 11 which is constructed to support in a support area a bale B arranged on the tailgate 11. The tailgate 11 is pivotal about a rotation axis 16, cf. FIG. 2 to FIG. 4. In the preferred embodiment the tailgate 11 is at least movable (pivotal) between a bale receiving position, a bale supporting position and a bale ejecting position. This tailgate 11 serves as the bale supporting construction.

The tailgate 11 comprises
a tailgate frame 17 and
a tailgate bottom 18 carrying a tailgate bottom roller 19.

At the tailgate frame 17 a wrapping device 20 is mounted. A reel 88 provides wrapping material (net, foil, twine, e.g.) to a bale in the bale forming chamber.

In FIG. 1 the tailgate 11 is shown in the bale receiving position. This bale receiving position is also the position which the tailgate 11 takes during the formation of a bale and is also the transport position, i.e. the position in which the tailgate 11 is preferably positioned when the bale forming apparatus is not used to create bales but is pulled over a public street, e.g.

The bale forming apparatus 1 is configured to hold a bale in a first bale position and a second bale position. The first bale position is arranged next to the outlet 7 of the intake device 5, and the second bale position is spaced away from the outlet 7.

In the first bale position, the bale formed or being formed is mainly supported by the two stationary supporting rollers 8.1, 8.2 arranged at opposite sides of the outlet 7 of the intake device 5, but may also partially be supported by the tailgate 11. The bale in the first bale position is in a bale forming chamber and is surrounded by the bale forming means 10.

The second bale position is defined by the bale supporting position of the tailgate 11. Thus, in this bale supporting position, the tailgate 11 holds a bale in the second bale position. This second bale position is positioned such that a new bale can be at least partially formed in the first bale position before the bale in the second bale position is ejected by the bale forming apparatus 1. Therefore the bale forming apparatus 1 carries at the same time a complete bale B on the bale supporting construction 11 and an increasing bale B' in the bale forming chamber adjacent to the outlet 7, cf. FIG. 9.

A bale can be transported from the first bale position to the second bale position by the following consecutive steps:
moving the bale from the first bale position away from the outlet 7 and onto the tailgate 11 arranged in the bale receiving position and
subsequently moving the tailgate 11 with the bale B from the bale receiving position into the bale supporting position.

Figure 2:
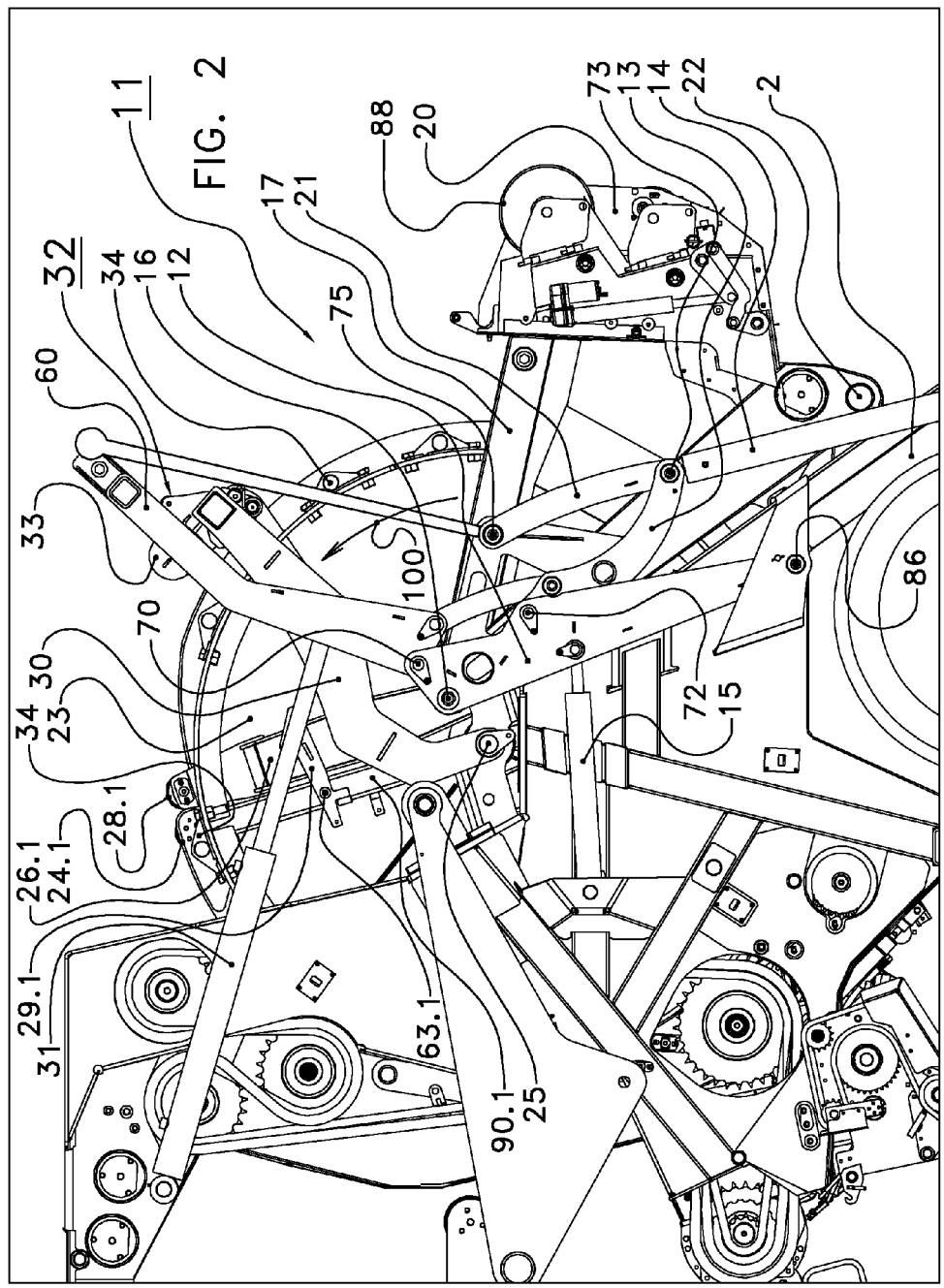
FIG. 2 shows a side view of the bale forming apparatus of FIG. 1 with the bale supporting construction in the bale receiving position.
Figure 3:
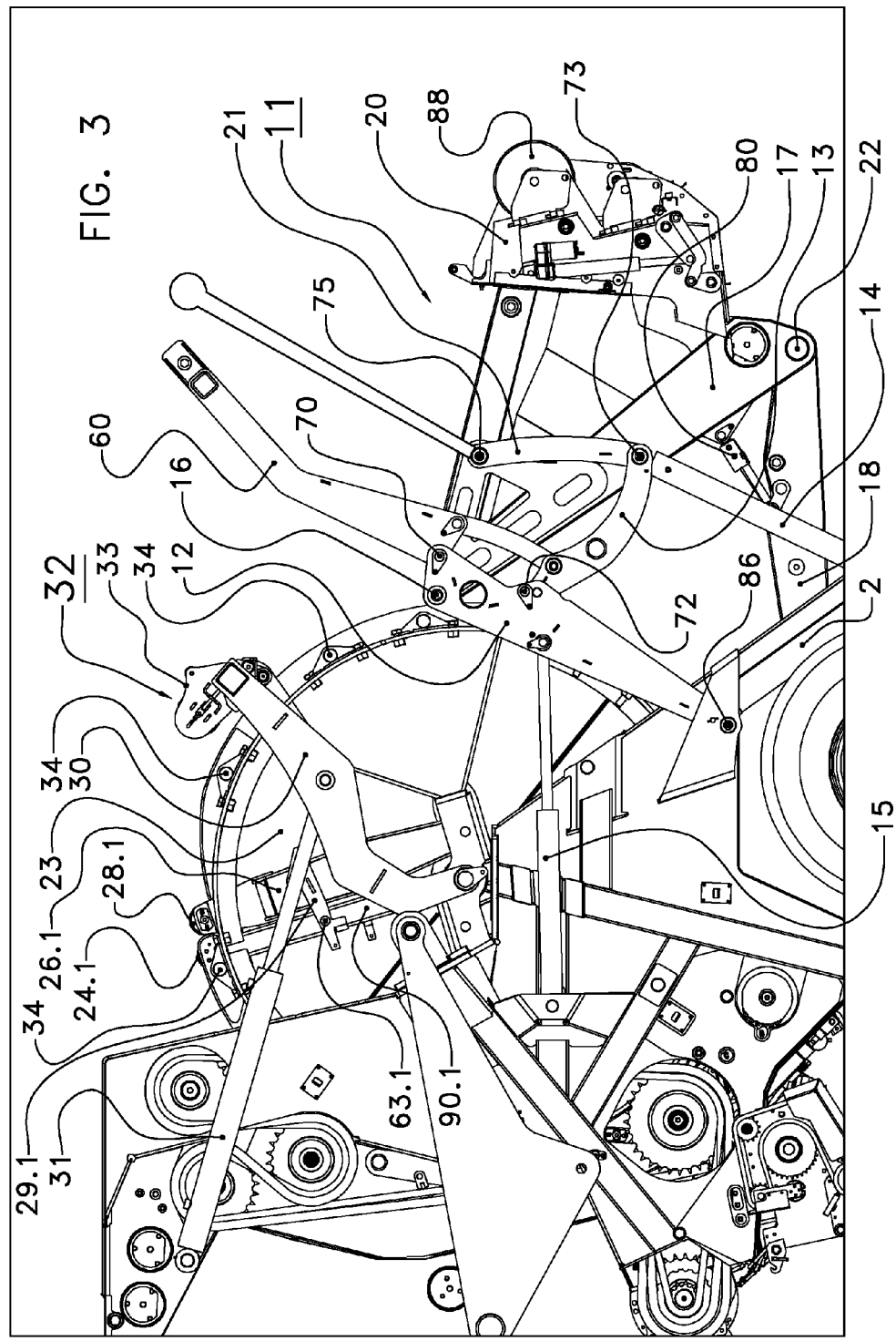
FIG. 3 shows the bale forming apparatus of FIG. 2 with the bale supporting construction in the bale supporting position.
Figure 4:
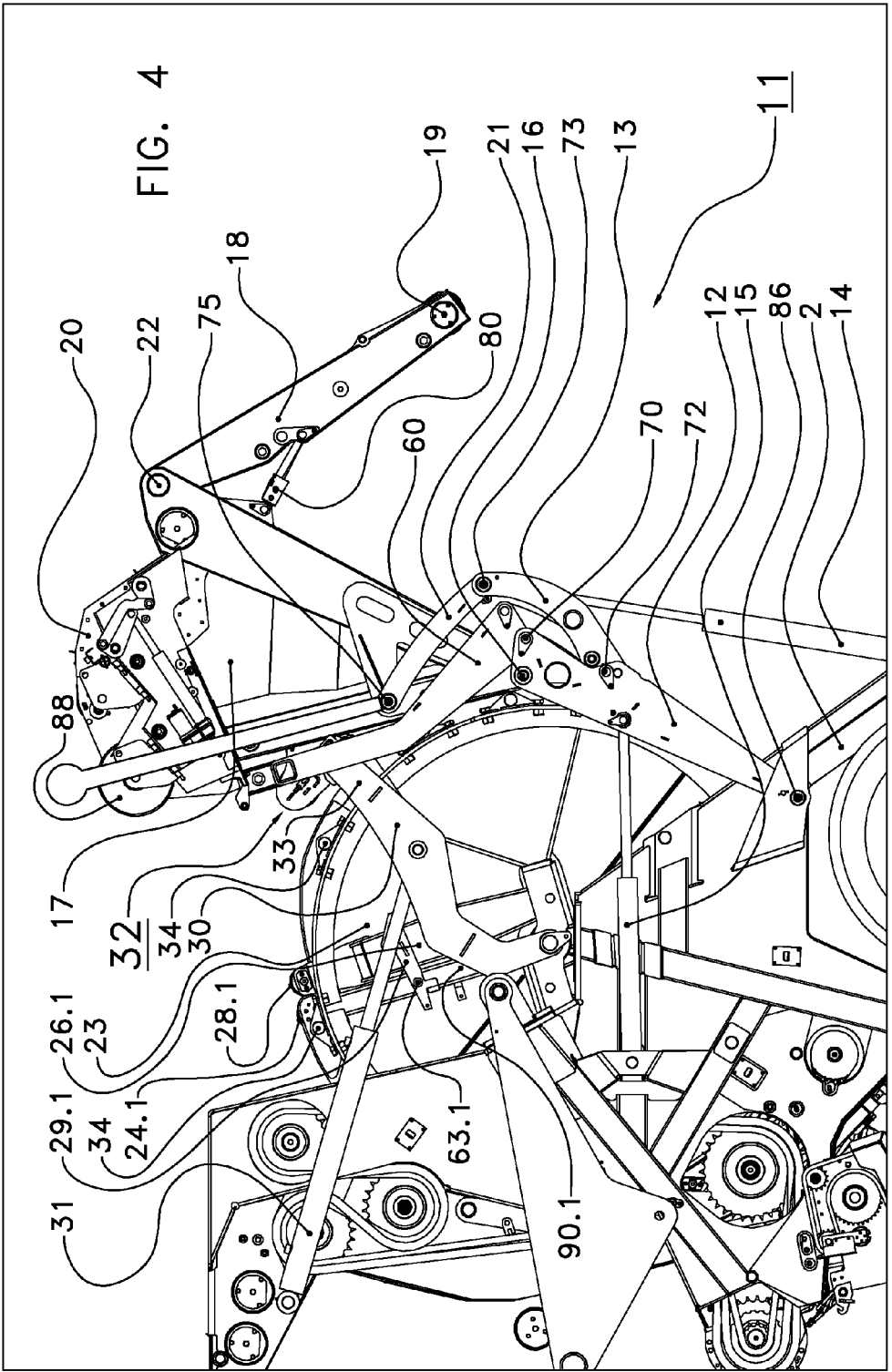
FIG. 4 shows the bale forming apparatus of FIG. 3 with the bale supporting construction in the bale ejecting position.

FIGS. 2 to 4 show the tailgate 11 in the bale receiving position, the bale supporting position, and the bale ejecting position, respectively.

The tailgate 11 comprises a first mechanism to accommodate the movement of the tailgate between the bale receiving position and the bale supporting position, and a second mechanism to accommodate the movement of the tailgate 11 between the bale supporting position and the bale ejecting position. The first mechanism is formed by a linking mechanism which provides for a relatively horizontal movement of the tailgate 11 between the bale receiving position and the bale supporting position. The second mechanism is a pivoting mechanism which provides a tilting movement between the bale supporting position and the bale ejecting position, so that in the ejecting position the bale can be released from the tailgate 11 by force of gravity.

The linking mechanism is formed by the frame 2, a rigid first tailgate lever arm 12, a rigid second tailgate lever arm 13, and a vertical hydraulic tailgate cylinder 14, cf. FIG. 2 to FIG. 4. The first tailgate lever arm 12 and the hydraulic vertical tailgate cylinder 14 are at their lower ends pivotally mounted on the frame 2. The upper ends of the first tailgate lever arm 12 and the hydraulic vertical tailgate cylinder 14 are connected to each other by means of the second tailgate lever arm 13. The second tailgate lever arm 13 is pivotally connected with the vertical tailgate cylinder 14 and with the first tailgate lever arm 12.

The first tailgate lever arm 12 is connected with the tailgate frame 17 in a pivoting axis 16. The third tailgate lever arm 21 is pivotally connected with the tailgate frame 17 in a pivoting axis 75. A distance between these two parallel pivoting axes 16, 75 occurs. The third tailgate lever arm 21 and the second tailgate lever arm 13 are pivotally connected with each other in a pivoting axis 73. The first tailgate lever arm 12 and the second tailgate lever arm 13 are pivotally connected in a pivoting axis 72. The first tailgate lever arm 12 is pivotally mounted at the front housing part of the frame 2 such that the first tailgate lever arm 12 can rotate around a stationary pivoting axis 86.

By movement of the tailgate 11 with respect to the front housing part about the pivoting axes of the linking mechanism 12, 13, 14, the tailgate 11 can be moved between the bale receiving position and the bale supporting position, as can be seen from a comparison of FIG. 2 in which the tailgate is shown in the bale receiving position with FIG. 3 in which the tailgate 11 is shown in the bale supporting position. Between these positions the tailgate 11 has been displaced in a substantially horizontal direction away from the outlet 7. A movement in a substantially horizontal direction is advantageous as the support surface for the bale formed by a part of the endless belt(s) 10 in the tailgate 11 also remains substantially horizontal, and, as a result, the bale B remains properly supported by the tailgate 11.

A hydraulic horizontal tailgate cylinder 15 is provided to actuate the tailgate 11 between the bale receiving position and the bale supporting position. FIG. 2 shows the horizontal tailgate cylinder 15 in a retracted position, FIG. 3 in an extended position.

The first tailgate lever arm 12 comprises a pivoting axis 16 about which the pivotal tailgate frame 17 is pivotal between the bale supporting position (FIG. 3) and the bale ejecting position (FIG. 4). The pivotal tailgate frame 17 supports the pivotal tailgate bottom 18 carrying a tailgate bottom roller 19, and a wrapping device 20 with a reel 88 for wrapping material (net, foil, e.g.). This tailgate bottom roller 19 serves as the further guiding member in the sense of depending claims.

By extending and retracting the hydraulic vertical tailgate cylinder 14, the pivotal tailgate frame 17 can be moved in a pivotal movement about the pivoting axis 16. FIG. 3 shows the vertical tailgate cylinder 14 in a retracted position, FIG. 4 in an extended position. A rigid third tailgate lever arm 21 is mounted between the pivotal connection of the second tailgate lever arm 13 and the hydraulic vertical tailgate cylinder 14 to transfer the actuation force exerted by the hydraulic vertical tailgate cylinder 14 to the pivotal tailgate frame 17.

FIG. 2 to FIG. 4 shows three rigid tailgate lever arms 12, 13, 21 and two tailgate cylinders 14, 15 mounted on the left side of the tailgate 11—seen in the travelling direction TD. Three corresponding rigid tailgate lever arms and two corresponding hydraulic tailgate cylinders (not shown) are mounted at the right side of the tailgate 11.

The pivotal tailgate bottom 18 can be pivoted with respect to the tailgate frame 17 about a pivoting axis 22 to move the tailgate bottom roller 19, when the tailgate 11 is positioned in the bale receiving position, between a high position and a low position. A hydraulic horizontal tailgate bottom cylinder 80 may be provided to move the pivotal tailgate bottom 18 between the high and the low position. This tailgate bottom cylinder 80 is connected with the tailgate frame 17 (right side) and with the tailgate bottom 18 (left side).

Figure 5:
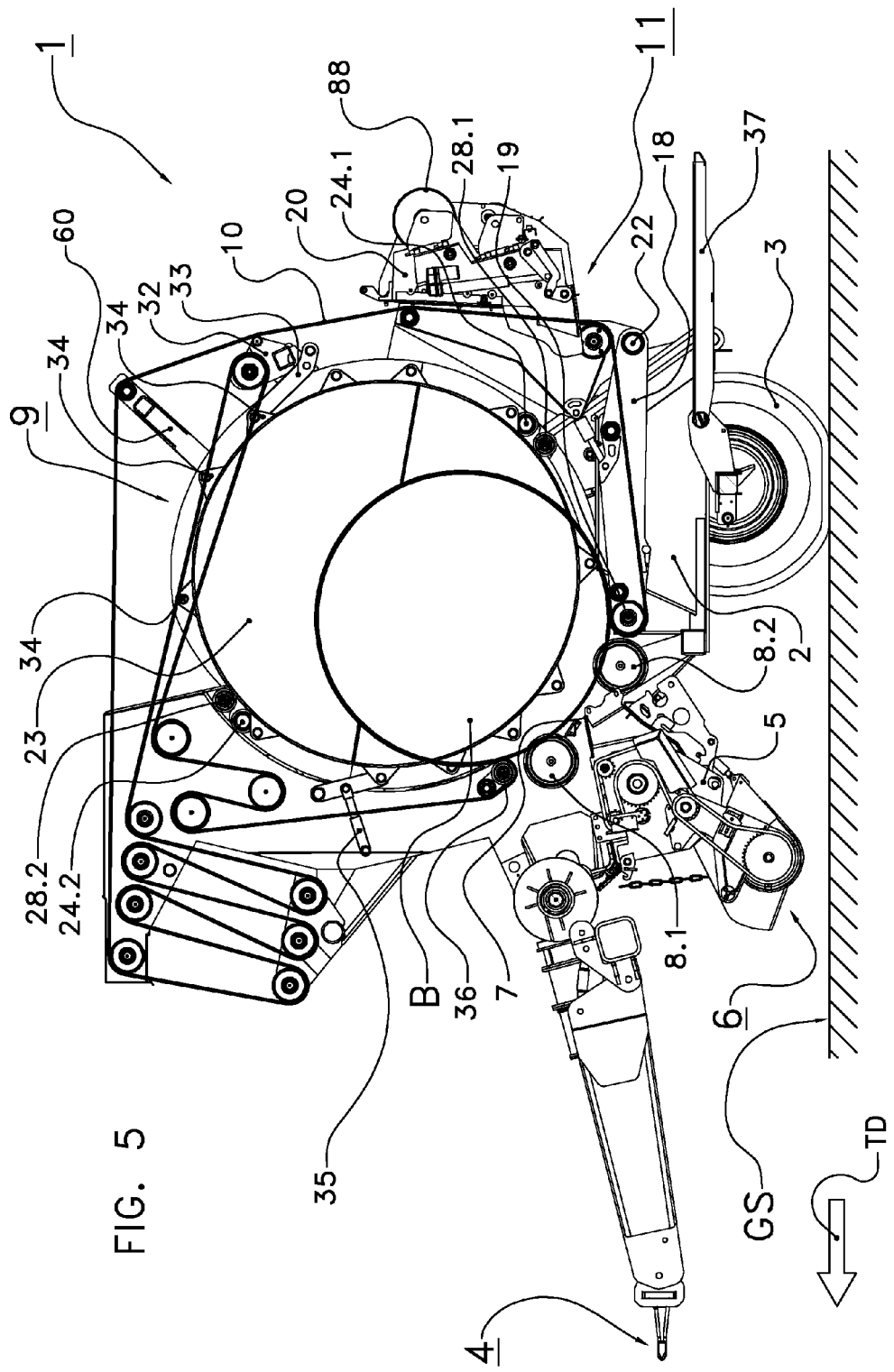
FIG. 5 shows a cross section of the bale forming apparatus of FIG. 1 with a completely formed bale in the bale forming chamber and the bale supporting construction in the bale receiving position and the pushing member and the pivotal guiding roller locked together and being in the pushing start position.
Figure 6:
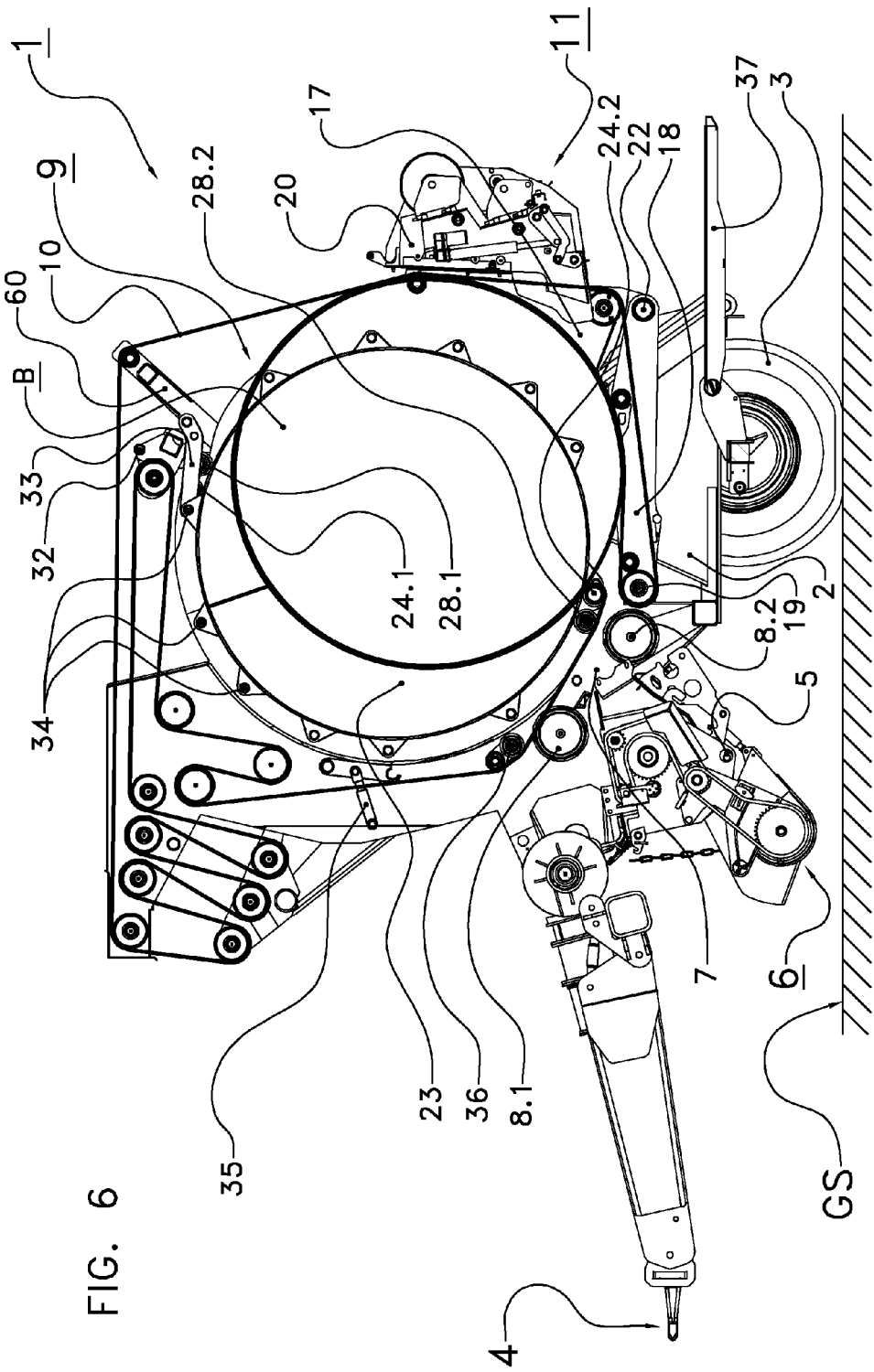
FIG. 6 shows the bale forming apparatus of FIG. 5 with the bale pushed onto the bale supporting construction still being in the bale receiving position where the pushing roller and pivotal guiding roller still locked together are rotated in the pushing direction into an intermediate position.

During formation of a bale in the first bale position, the tailgate bottom roller 19 is normally positioned in the high position. When the bale is to be transferred from the first bale position to the second bale position, the high position of the tailgate bottom roller 19 may interfere with other elements of the bale forming device, for instance movements of a pushing roller and the tailgate bottom roller 19 to be described below. To avoid such interference the tailgate bottom roller 19 may be positioned in the low position while the tailgate 11 is still in the bale receiving position. FIG. 5 and FIG. 6 show the high position, FIG. 7 the low position.

In the following a first embodiment of the bale pushing device is described.

The bale forming apparatus 1 comprises two supporting disks 23 arranged at opposite sides of the bale forming apparatus 1. The bale forming chamber is arranged between these two parallel supporting disks 23. Every supporting disk 23 is arranged between the frame 2 and the bale forming chamber. The figures show the left supporting disk 23—seen in the travelling direction TD. These two disks 23 together serve as the holding device of the embodiment. Between the two supporting disks 23 two pushing rollers 24.1, 24.2 are mounted on the circumference of the supporting disks 23 at an angle of 180 degrees. The two supporting disks 23 are rotatable about a substantially horizontal disk rotating axis 25 in a rotating direction 100. The disk rotating axis 25 is situated in the middle between these two pushing rollers 24.1, 24.2.

In one embodiment the two supporting disks 23 are further connected by means of a rigid idler axle. This idler axle extends along the stationary disk rotating axis 25 and can be rotated around the disk rotating axis 25. In a further embodiment the two parallel supporting disks 23 are only connected by the two pushing rollers 24.1, 24.2 and the pivotal guiding rollers 28.1, 28.2 (describe below). This further embodiment provides more space between the two parallel supporting disks 23. This space can be used for a bale growing in the bale forming chamber.

The pushing roller 24.1 is mounted on a supporting arm 90.1. The pushing roller 24.1 is mounted on a supporting arm 90.2. The supporting arms 90.1, 90.2 operate as spokes of the left supporting disk 23. The pushing rollers 24.1, 24.2 are in addition mounted on two further corresponding supporting arms (not shown) which serve as spokes of the right supporting disk.

In the embodiment the two pushing rollers can rotate around their own rotating axes (perpendicular to the drawing plain of the figures) but cannot amend their position with respect to the supporting disks 23. Therefore the pushing rollers 24.1, 24.2 remain in their positions with respect to the circumferential surfaces of the supporting disks 23 during the entire operation.

A stationary retarding device 35 prevents the supporting disks 23 from rotating in the opposite direction. In one embodiment a stop element mounted at a supporting disk 23 is stopped by the retarding device 35 if the supporting disks 23 are rotated in the opposite direction. The retarding device 35 does not inhibit the rotation of the supporting disks 23 in the rotating direction 100.

In one embodiment a spring or an alternative retaining device urges a pivotally mounted flipper element against a supporting disk 23. This flipper element contacts the supporting disk 23 and prevents it from rotating in a direction opposite to the rotating direction 100. When being rotated in the rotating direction 100 the supporting disk 23 pivots the flipper element against the force of the spring.

The pushing rollers 24.1, 24.2 extend between the two supporting disks 23 and are connected with these supporting disks 23 such that every pushing roller 24.1, 24.2 can rotate around a rotating axis parallel to the disk rotating axis 25 but cannot be shifted laterally and cannot be shifted along the circumferential edge of a supporting disk 23. Every pushing roller 24.1, 24.2 comprises a rigid axle connecting the two supporting disks 23. These pushing rollers 24.1, 24.2 serve as the pushing members in the sense of dependent claims.

The left supporting disk 23 pivotally supports two swing arms 26.1, 26.2 for two pivotal guiding rollers 28.1, 28.2. The corresponding right supporting disk pivotally supports two corresponding further swing arms. The pivotal guiding roller 28.1 is supported by a pair of two swing arms (left swing arm, right swing arm) which are pivotally mounted on one arm pivoting axis 27.1. The position shown in FIG. 8 to FIG. 11 is called the "guiding position" as the pivotal guiding rollers 28.1 and 28.2 guide the belt(s) 10 when being in the guiding position. FIG. 5 to FIG. 7 show the pivotal guiding roller 28.1 in a parking position in which the pivotal guiding roller 28.1 does not guide—or at least does not stretch and does not tension—the belt(s) 10.

The pivotal guiding roller 28.2 is supported by a further pair of two swing arms which are pivotally mounted on one arm pivoting axis 27.2. The radially extending free ends of the two swing arms of such a pair carry the connected pivotal guiding roller 28.1 or 28.2 between them. A bale B in the bale forming chamber is situated between two swing arms of such a pair. As the bale forming apparatus 1 comprises two pivotal guiding rollers 28.1, 28.2, there are four swing arms (two pairs each with two swing arms). The pivotal guiding roller 28.1 or 28.2 connects the two swing arms of a pair. FIG. 2 to FIG. 4 show one swing arm 26.1.

These pivotal guiding rollers 28.1, 28.2 serve as the pivotal guiding members in the sense of depending claims. The swing arms 26.1, 26.2 operate as the guiding member arms.

Preferably every pushing roller 24.1, 24.2 and every pivotal guiding roller 28.1, 28.2 comprise rolls which are adapted for guiding and supporting the belt(s) 10. But every pushing roller 24.1, 24.2 and every pivotal guiding roller 28.1, 28.2 is only temporally in contact with the pressing belts(s) 10 and guides and stretches them only temporally. In one embodiment two lateral guiding units (not shown) inhibit a lateral movement of a belt 10, i.e. a movement of the belt 10 parallel to the disk rotating axis 25. Every such lateral guiding unit can comprise a disk which rotates around a rotating axis perpendicular to the conveying direction of the belt(s) 10.

The pressing belt(s) 10 are guided by further guiding rollers, cf. FIG. 1. In order to ensure permanently a sufficient tension a guiding roller is mounted on the free end of a tensioning arm 60. This tensioning arm 60 can be pivoted around a pivoting axis being perpendicular to the drawing plain of FIG. 1.

The pressing belts 10 are guided around several rollers, amongst them around the roller 74.1 at the free end of a pivotal tensioning arm 60. This tensioning arm 60 is pivotally connected with the first tailgate lever arm 12 in a pivoting axis 70. Pivoting the tensioning arm 60 will shift the roller 74.1 and will vary the tension of the pressing belts. Thereby the tensioning arm 60 can compensate a lower tension of the pressing belts 10 as a consequence of ejecting a bale B.

The arm pivoting axes 27.1, 27.2 are arranged substantially parallel, but spaced away from the disk rotating axis 25 what can best be seen in FIG. 1. Therefore a lever arm between the disk rotating axis 25 and a swing arm 26.1, 26.2 occurs. In the position shown in FIG. 1 the pushing roller 24.1 and the pivotal guiding roller 28.1 are positioned next to each other on the circumference of the supporting disks 23. The pushing roller 24.2 and the pivotal guiding roller 28.2 are also positioned next to each other. By rotating a pair of two swing arms about the pivoting axis 27.1 or 27.2, the connected pivotal guiding roller 28.1 or 28.2 can be moved to a position spaced from the corresponding pushing roller 24.1 or 24.2 (the guiding position). Due to the relative position between the disk rotating axis 25 of the supporting disks 23 and the corresponding pivoting axle 27.1, 27.2 of the pair of swing arms, the pivotal guiding roller 28.1, 28.2 will during such movement also be moved to a position radially outwards from the circumference of the supporting disks 23. The distance between a pivotal guiding roller 28.1, 28.2 and the disk rotating axis 25 increases while the pivotal guiding roller 28.1, 28.2 is pivoted into the guiding position.

As this lever arm between the pivoting axis 27.1, 27.2 and the disk rotating axis 25 occurs, every swing arm 26.1, 26.2 is pushed by the rotating supporting disk 23 and shifts the connected pivotal guiding roller 28.1, 28.2 away from the disk rotating axis 25. Preferably a longitudinal slot guides the pivotal guiding roller 28.1, 28.2 and limits a movement of the pivotal guiding roller 28.1, 28.2. The longitudinal slot extends approximately vertical and can be arcuate. This embodiment saves an own drive for the swing arms 26.1, 26.2 or for the pivotal guiding rollers 28.1, 28.2 besides the drive (described below) for the supporting disk 23. The rotating supporting disk 23, the swing arms 26.1, 26.2 being connected in the pivoting axes 27.1, 27.2 spaced away from the disk rotating axis 25, and the pivotal guiding roller 28.1, 28.2 operate like a reciprocating piston arrangement of a square baler, e.g.

With this relative movement between the pivotal guiding roller 28.1, 28.2 and the supporting disks 23, the pivotal guiding roller 28.1, 28.2 can be positioned in a guiding position relatively next to the rear stationary supporting roller 8.2 at the back side of the outlet 7. When being pivoted into the guiding position, the pivotal guiding roller 28.1, 28.2 is in this next position. It may be possible that the pivotal guiding roller 28.1, 28.2 being near the outlet 7 can only be moved to this position after the tailgate bottom roller 19 has been moved to the low position, cf. FIG. 7.

Any suitable device may be provided to move a pair of two swing arms between different rotational positions.

In the embodiment shown in FIGS. 2 to 4, a locking pawl 29.1 is provided to hold the pivotal guiding roller 28.1 in the parking position adjacent to the pushing roller 24.1, as shown in FIG. 1 to FIG. 7. This locking pawl 29.1 is pivotally mounted at the supporting arm 90.1 for the pushing roller 24.1 and can be locked with the swing arm 26.1. A further locking pawl 29.2 is provided to hold the pivotal guiding roller 28.2 in the position adjacent to the pushing roller 24.2 and is pivotally mounted at the supporting arm 90.2.

In this embodiment every locking pawl 29.1, 29.2 is pivotally connected with one supporting arm 90.1, 90.2 of the supporting disk 23 and can engage into a corresponding holding element rigidly mounted at the swing arm 26.1, see FIG. 2 to FIG. 4. This holding element may be a pin rigidly mounted on the swing arm 26.1, 26.2. The locking pawl 29.1 is shown in a locking position. An actuator can pivot the locking pawl 29.1 away from this holding element such that connection between the swing arm 26.1 and the locking pawl 29.1 is released. The actuator can shift back the locking pawl 29.1, 29.2 into a locking position in which the locking pawl 29.1, 29.2 engages the pin or the other holding element on the swing arm 26.1, 26.2.

The locking pawl 29.1 can connect the supporting arm 90.1 with the swing arm 26.1. Three further locking devices connect the other three swing arms with the adjacent supporting arm, among them one locking pawl 29.2 for connecting the swing arm 26.1 for the guiding roller 28.2 with the supporting arm 90.2 for the pushing roller 24.2.

A disk actuation system is provided to move the supporting disks 23 around the rotational axis between different rotational positions. Preferably this drive rotates the two supporting disks 23 in an indexing fashion. The disk actuation system of the embodiment comprises an actuator arm 30 pivotally mounted about the disk rotating axis 25, an actuating cylinder 31 to actuate movement of the actuator arm 30, and a coupling device 32. The actuating cylinder 31 is at its lower end pivotally connected with the frame 2 end at its upper and pivotally connected with the actuator arm 30. The coupling device 32 comprises

- a disk engaging hook 33 biased towards the supporting disks 23 and
- a hydraulic cylinder for pivoting this disk engaging hook 33.

The supporting disks 23 have about their circumference several coupling pins 34.

By pulling the actuator arm 30 in the rotating direction 100 towards the front end 4 of the bale forming apparatus 1, the disk engaging hook 33 will couple with one of the coupling pins 34. The actuator arm 30 connected via the disk engaging hook 33 rotate the supporting disks 23 about the disk rotating axis 25 also in the rotating direction 100 to a desired rotational position. The movement of the supporting disks 23 to a desired position may be carried out by one or more strokes of the actuating cylinder 31. When the actuating cylinder 31 is extended to move the actuator arm 30 back, i.e. away from the front end 4 of the bale forming apparatus 1 and opposite to the rotating direction 100, any coupling pins 34 which are encountered during the backwards trajectory will not be coupled to the disk engaging hook 33. By these forward and backwards movements of the actuator arm 30, the supporting disks 23 may be moved to any desired rotational position. As mentioned above a rotation of the supporting disks 23 in the opposite direction is inhibited.

The retarding device 35 is provided to lock the rotational position of the supporting disks 23, for example when the actuator arm 30 is moved by the actuating cylinder 31 in a backwards direction opposite to the rotating direction 100 during which the disk engaging hook 33 is not coupled to any of the coupling pins 34.

It is remarked that any other device to move the supporting disks 23 in a rotational movement may also be applied. In particular a shaft extending along the disk rotating axis 25 can be driven and rotates the two supporting disks 23. It is also possible that at least one driven sprocket wheel engages corresponding teeth at the outer surface of a supporting disk 23 and rotates the supporting disk 23.

The formation and transfer of a bale until ejecting it and the function of the different parts of the bale forming apparatus 1 therein will now be presented in more detail.

FIG. 1 and FIG. 2 show the bale forming apparatus 1 with the tailgate 11 in the bale receiving position, e.g. the fully closed position of the tailgate 11, and the tailgate frame 17 in a first position or start position and having the horizontal tailgate cylinder 15 in the extended position. Crop material is introduced through the outlet 7 into a bale forming chamber surrounded by the segment of the bale forming means 10 extending between the first guiding element 19 and a fixed guiding roller 36.

FIG. 5 shows a bale B being formed in the first bale position in the bale forming apparatus 1. The bale B is supported by the two stationary supporting rollers 8.1, 8.2 and the tailgate bottom roller 19 mounted at the free end of the pivotal tailgate bottom 18 of the tailgate 11. By continuously feeding further crop material through the outlet 7, the bale B grows until a selected parameter is fulfilled, such as a desired diameter or weight of the bale B is achieved, a selected time interval has passed, or a selected tension in the endless belt(s) 10 operating as the bale forming means is reached.

It is remarked that the selected parameter can be monitored by any suitable sensor. For example, an ultrasonic or optical sensor may be provided to measure the current diameter of the bale being formed in the bale forming apparatus. The sensor may be directed radially with respect to the bale. Or a tensioning sensor measures the tension of the bale forming means 10.

The bale B shown in FIG. 5 is ready to be transferred to the second bale position, for instance since the bale has a desired diameter or exerts a pressure to the belt(s) 10 which exceeds a given threshold. A first step to transfer the bale B to the second bale position is to transfer the bale B completely onto the tailgate 11 so that the bale B is completely supported by the tailgate 11 and in particular entirely carried by the tailgate bottom 18. To move the bale B onto the tailgate 11, the bale B is pushed by the pushing roller 24.2 on the tailgate 11 by rotation of the supporting disks 23 counter clockwise in the rotation direction 100. The pushing roller 24.2 performs a movement on a circular path until the pushing roller 24.2 has passed the outlet 7. During this part of the rotating movement of the supporting disks 23, the locking pawl 29.2 remains in the locking position. The locking pawl 29.1 in the locking position maintains the relative position between the pushing roller 24.1 and the pivotal guiding roller 28.1 adjacent to each other. The connected rollers 24.1, 28.1 both remain in a parking position.

FIG. 6 shows the bale forming apparatus 1 after having rotated the supporting disks 23 in the rotation direction 100. The pushing roller 24.2 mounted on the supporting arm 90.2 has been moved along a circular path, cf. FIG. 5 and FIG. 6. The bale B has been pushed by the pushing roller 24.2 completely onto the tailgate 11 which is positioned in the bale receiving position. The rotation of the supporting disks 23 is performed by one or more forward movements of the actuator arm 30 in the rotating direction 100, while the disk engaging hook 33 is coupled to one of the coupling pins 34. During a backwards movement of the actuator arm 30 opposite to the rotating direction 100 the disk engaging hook 33 is not coupled to the coupling pins 34 so that the disk engaging hook 33 can be moved to a further coupling pin 34 for renewed actuation of the supporting disks 23. During the backwards movements, the retarding device 35 may hold the supporting disks 23 in a fixed rotational position. The retarding device 35 or the flipper elements prevent the supporting disks 23 from rotating opposite to the rotating direction 100.

Due to the rotation of the supporting disks 23 and therewith the movement of the pushing roller 24.2 in the pushing direction and along the circular path past the outlet 7 of the intake device 5, the function of the fixed guiding element 36 to guide the belt(s) 10 and to form the bale forming chamber holding the bale B is taken over by the pushing roller 24.2 mounted on the supporting disks 23. In other words the bale forming chamber formed for holding the bale B is now formed by the segment of the belt(s) 10 between the tailgate bottom roller 19 and the pushing roller 24.2.

In a second step of the transfer of the bale B from the first bale position to the second bale position, the tailgate 11 is moved from the bale receiving position to the bale supporting position. This movement about the pivoting axes of the linking mechanism is actuated by the hydraulic horizontal tailgate cylinder 15.

Substantially simultaneously to the movement of the tailgate 11 from the bale receiving position to the bale supporting position the supporting disks 23 are rotated to maintain substantially the same distance between the tailgate bottom roller 19 and the pushing roller 24.2 so that the bale B is maintained in the bale forming chamber formed by the belt segment between the tailgate bottom roller 19 and the pushing roller 24.2.

However, before these movements of the tailgate 11 and the supporting disks 23 are made, the tailgate bottom roller 19 is brought into the low position. In this position it does not interfere with the circular path of movement of the pushing roller 24.2. In one embodiment the step of lowering the tailgate bottom roller 19 is performed before the step of rotating the two supporting disk 23. The lowering step is the transfer of the tailgate bottom roller 19 from the position of FIG. 5 to that of FIG. 7. The subsequent rotating step is the rotation of the supporting disk 23 from the position of FIG. 5 to that of FIG. 6.

FIG. 7 shows the bale forming apparatus 1 after the movement of the tailgate bottom roller 19 from the high position to the low position but before the movement of the tailgate 11 from the bale receiving position to the bale supporting position.

In one embodiment the supporting disks 23 are pivotally connected with the pivotal tailgate bottom 18, e.g. by means of a lever arrangement (not shown). The step that the rotated supporting disks 23 guide the pushing roller 24.2 from the parking position shown in FIG. 5 into the position behind the outlet 7 shown in FIG. 7 urges the pivotal tailgate bottom 18 to be lowered down. This embodiment further decreases the risk that the rotated pushing roller 24.2 hits the tailgate bottom roller 19.

FIG. 8 shows the bale forming apparatus 1 after having moved the tailgate 11 carrying the bale B from the bale receiving position to the bale supporting position. FIG. 8 shows the bale forming apparatus 1 after the simultaneous rotation of the two supporting disks 23 to move the pushing rollers 24.1, 24.2 to maintain a substantially same distance between the first guiding element 19 and the pushing roller 24.2.

The bale B is now positioned in the second bale position.

In addition the transfer from FIG. 7 to FIG. 8 comprises the step that the locking pawl 29.2 and the corresponding locking pawl on the right side which have connected the two rollers 24.2, 28.2 with each other are pivoted into a releasing position. The rollers 24.2, 28.2 are no longer connected with each other. During the rotation of the supporting disks 23, the pair of swing arms for the pivotal guiding roller 28.2 has also been rotated about the pivoting axis 27.2 in the opposite direction to create a distance between the pushing roller 24.2 and the pivotal guiding roller 28.2. Due to the rotation about the pivoting axis 27.2, and the mutual relation between the pivoting axis 27.2 of the pair of swing arms for the pivotal guiding roller 28.2 and the disk rotating axis 25 of the supporting disks 23, the pivotal guiding roller 28.2 is extended radially outwards with respect to its radial position next to the pushing roller 24.2, as shown in FIG. 7. The pivotal guiding roller 28.2 is now in the guiding position and contributes to form a bale forming chamber adjacent to the outlet 7.

The movement of the pair of swing arms (the swing arm 26.2 and the corresponding right swing arm) to move the pivotal guiding roller 28.2 between the position next to the pushing roller 24.2, as shown in FIG. 7, to a position spaced from the pushing roller 24.2, as shown in FIG. 8, may be actuated by any suitable actuator, which may be arranged on one or both of the supporting disk 23, on the frame 2 or any other suitable location. The movement may also be created by a suitable guiding mechanism and/or a retarding mechanism. In one embodiment the rotating disks 23 shift the pivotally mounted swing arms 26.1, 26.2 for the pivotal guiding roller 28.2. The pivotal guiding roller 28.2 is pushed and is guided in the longitudinal slots from the position shown in FIG. 7 to the position shown in FIG. 8.

The wrapping device 20 may provide a wrap around the bale B during transfer of the bale B towards and/or when the bale B is arranged on the tailgate 11 in the second bale position. In the embodiment, the wrapping device 20 with the reel 88 is arranged at the rear end of the bale forming apparatus 1. The winding of the wrapping material around the bale may already be started in the first bale position, as long as there is no wrapping material between the outlet 7 of the intake device 5 and the bale B being formed.

Preferably, a wrap is already provided around a substantial part of the circumference when the bale B is in the first bale position, whereby there is no wrapping material between the outlet 7 of the intake device 5 and the bale B being formed. The rotating bale B remains in the first position and pulls wrapping material counter clockwise along the bale forming means 10. The bale B is pushed onto the tailgate 11 before the wrapping material reaches the outlet 7. The wrapping material will not hamper the entrance of crop material in the bale forming chamber and thus do not prevent the formation of the bale B in the bale forming chamber. As soon as the bale B has the desired size, in particular when the pushing roller 24.2 is moved to push the bale B on the tailgate 11 in the bale receiving position, the wrapping device 20 may release further wrapping material to provide a wrap around the complete circumference of the bale. In this way the wrapping material is provided relatively quickly about the complete circumference of the bale B. This reduces the risk that the crop material of the bale will loosen or even fall apart during transfer of the bale from the first bale position to the second bale position.

In the first bale position next to the outlet 7 of the intake device 5, space is now available for the formation of a new bale. In the situation shown in FIG. 8 the formation of a new bale B' has already started. The part of the endless belt(s) 10 between the fixed guiding roller 36 and the pivotal guiding roller 28.2 being in the guiding position is used to form a bale forming chamber adjacent to the outlet 7 for the new bale B'. Since the pivotal guiding roller 28.2 is spaced at a substantial distance from the pushing roller 24.2, the bale B' may grow to a substantial diameter before the bale B' in the first bale position interferes with the bale B in the second bale position, as shown in FIG. 9. This effect is in particular achieved as the bale supporting construction 11 with the bale B is first pivoted into an intermediate bale supporting position before ejecting the bale B. The wrapping of the bale B is completed while the bale is on the bale supporting construction 11 being in the bale supporting position. The bale B can now be ejected.

When the bale B is ready to be ejected from the bale forming apparatus 1, the tailgate 11 is moved from the bale supporting position around the pivoting axis 16 into the bale ejecting position. This bale ejecting position may correspond to the fully open position of the tailgate 11 of the bale forming apparatus, wherein a bale is ejected from the bale forming apparatus 1.

FIG. 10 shows the tailgate 11 in the bale ejecting position. The tailgate 11 is moved to this bale ejecting position by a pivoting movement of the pivotal tailgate frame 17 about the pivoting axis 16. This pivoting movement is actuated by an extension of the vertical hydraulic cylinder 14, cf. FIG. 3 and FIG. 4. In this bale ejecting position the bale B is ejected by force of gravity from the bale forming apparatus 1. A release control device 37 is provided to control actual release of the bale B from the bale forming apparatus. Such mechanical release control device 37 is known in the art. This release control device 37 may comprise a ramp or chute over which the bale B rolls down onto the grown surface GS. In a further embodiment a rigid rod causes the bale B to be tilted such that the bale B lies on a front face and cannot role away.

During ejecting and thereby releasing the bale B from the bale forming apparatus 1, the supporting disks 23 are held in the same rotational position so that the pushing rollers 24.1, 24.2 and the pivotal guiding roller 28.1, 28.2 remain in substantially the same position.

The bale B' in the first bale position continues to grow in the bale forming chamber formed by the belt segment between the pivotal guiding roller 28.2 and the fixed guiding element 36 at least until the "old" bale B is released from the bale forming apparatus 1 and the tailgate 11 is returned in a position in or near the bale receiving position wherein the first guiding roller 19 of the tailgate 11 can take over the function of the pivotal guiding roller 28.2 to form a bale forming chamber together with the fixed guiding roller 36.

FIG. 11 shows a position of the tailgate 11 where the tailgate 11 is almost returned to the bale receiving position after having ejected the bale B. The pivotal guiding roller 28.2 is still in the guiding position. To move the tailgate 11 back to the bale receiving position, the pivotal tailgate frame 17 is pivoted back to the bale supporting position by retracting the vertical hydraulic cylinder 14. Consequently the linking mechanism 12, 13, 21 is pivoted about its pivoting axes, by retracting the horizontal hydraulic cylinder 15 to move the tailgate 11 back to the bale receiving position. The tailgate bottom roller 19 is still positioned in the low position since the pivotal guiding roller 28.2 is still in the guiding position next to the supporting roller 8.2.

Before the tailgate 11 can be completely moved to the original bale receiving position, i.e. with the tailgate bottom roller 19 in the high position, the tailgate bottom roller 19 has to be moved upwards, i.e. back to its position next to the pushing roller 24.2 and/or away from the position the gap closing roller 22 has to be moved to the inactive position.

By movement of the corresponding swing arms, the connected pivotal guiding roller 28.2 can be moved in the position next to the pushing roller 24.2 (parking position). By rotation of the supporting disks 23, the pushing roller 24.2 and the pivotal guiding roller 28.2 can be moved to the position shown in FIG. 1 at the lower back side of the supporting disks 23. The supporting disks 23 have been rotated over an angle of 180 degrees during the sequence shown from FIG. 1 to FIG. 11.

The supporting disks 23 support two sets of guiding elements: the pushing roller 24.1 and the pivotal guiding roller 28.1 (first set) and the pushing roller 24.2 and the pivotal guiding roller 28.2 (second set). The second set was used for transferring the bale B. In the embodiment these two sets are disposed diametrically opposed to each other, i.e. at 180 degrees on the circumference of the supporting disks 23. Therefore the first set of pushing roller 24.1 and pivotal guiding roller 28.1 is now ready to be used for a new transfer of bale B' from the first bale position to the second bale position. The tailgate 11 can also be brought back in the original position as shown in FIG. 1.

When the bale B' fulfills the selected parameter or parameters (size or pressure or time period), the transfer of the bale B' from the first bale position to the second bale position may now be performed, similar to the transfer of the bale B described above, and a new bale may be formed in the first bale position. Thereafter further cylindrical bales may be formed with the bale forming apparatus 1. For each bale, the tailgate 11 will be moved from the bale receiving position, via the bale supporting position to the bale ejecting position and back to the bale receiving position, and the supporting disks 23 will be rotated over an angle of 180 degrees per formed bale.

The movements of the tailgate 11 and the supporting disks 23 may be configured such that continuous taking in of crop material into the bale forming apparatus 1, even at a high rate, and thus continuous driving of the bale forming apparatus 1 over the ground surface GS, is possible.

The only moment that feeding of crop material into the bale forming device 9 may not be possible or is only limited possible is when a pivotal guiding roller 28.1, 28.2 or a pair of swing arms arm carrying a pivotal guiding roller 28.1, 28.2 passes the outlet 7 of the intake device 5.

It may be advantageous to provide a feeding channel bottom in the intake device 5 that is movable in a substantially vertical direction between a normal position and a lowered position. With the feeding channel bottom in the lowered position an interior volume of the intake device is increased in comparison with an interior volume of the intake device 5 in the normal position of the movable bottom. The bale forming apparatus 1 is configured to move the movable bottom from the normal position to the lowered position just before the pushing roller 24.1, 24.2 passes before the outlet 7 of the intake device 5 and the roller 8.2 by rotation of the supporting disks 23, and to move the bottom back from the lowered position to the normal position after the pivotal guiding roller 28.1, 28.2 next to this pushing roller 24.1, 24.2 has passed the outlet 7.

In this way the interior and therefore the capacity of the intake device 5 may temporarily be increased to store extra crop material when a pushing roller 24.1, 24.2 or a pivotal guiding roller 28.1, 28.2 pass before the outlet 7.

In one embodiment an active means, e.g. a hydraulic cylinder, moves the channel bottom downwards and upwards. In a further embodiment the channel bottom is lowered downwards by crop material in the intake device against the force of a resilient means, e.g. against a spring. The resilient means moves up the channel bottom 5 again if the pressure exerted by the crop material decreases.

It is remarked that hereinabove only the guiding rollers to form a bale forming chamber have been denoted and described in detail. The bale forming apparatus will have multiple further guiding rollers at fixed and movable location to guide the endless belt(s) 10. These guiding rollers may also include tensioning guiding rollers to tension the endless belt(s) 10 and driving rollers to drive the endless belt(s) 10, in particular the guiding roller on the tensioning arm 60. These guiding rollers are shown in FIGS. 1 to 29 but are not denoted by reference numerals.

The movements of the tailgate 11 and of the supporting disks 23 may be performed by any suitable devices. In an embodiment, these movements are caused by hydraulic devices, such as hydraulic cylinders.

FIG. 12 to FIG. 16 demonstrate an embodiment for rotating a supporting disk 23 and for releasing the pivotal guiding roller 28.2 from the pushing roller 24.2. The actuating cylinder 31 is connected
  with the frame 2 in the stationary pivoting axis 95 and
  with the actuator arm 30 in the pivoting axis 96.

The actuating cylinder 31 rotates the supporting disk 23. In the situation of FIG. 12 the disk engaging hook 33 engages the coupling pin 34.1. A disk locking cylinder 83 mounted at the free end of the actuator arm 30 can pivot the disk engaging hook 33 into an engaging state and into a releasing state.

The vertical tailgate cylinder 14 and the horizontal tailgate cylinder 15 pivot the tailgate 11 from the bale receiving position into the bale supporting position. The pivotal guiding roller 28.2 is mounted on the free end of the swing arm 26.1. A swing arm pivoting hook 41 can be rotated around the stationary pivoting axis 45 and has a catching and locking hook 46 and an arcuate guiding edge 44 facing towards the disk rotating axis 25, cf. FIG. 12. A hydraulic horizontal swing arm hook cylinder 42 can rotate the swing arm pivoting hook 41 around the stationary pivoting axis 45. This swing arm hook cylinder 42 is pivotally connected with the swing arm pivoting hook 41 and the frame 2. The locking pawl 29.1 is rotatable connected with the supporting arm 90.1 of the supporting disk 23 in the pivoting axis 63.1.

The sequence from FIG. 12 to FIG. 16 shows the following steps:
The actuating cylinder 31 in cooperation with the actuator arm 30 rotates the supporting disk 23.
The vertical tailgate cylinder 14 and the horizontal tailgate cylinder 15 pivot the tailgate 11 from the bale receiving position into the bale supporting position.
The horizontal swing arm hook cylinder 42 rotates the swing arm pivoting hook 41 around the axis 45.
The locking pawl 29.1 is pivoted from the locking position (FIG. 12) into the releasing position (FIG. 16) by rotating the locking pawl 29.1 around the pivoting axis 63.1.
The arcuate edge 44 of the swing arm pivoting hook 41 guides the swing arm 26.1.

In the situation shown in FIG. 12 and in FIG. 13 the locking pawl 29.1 engages the coupling pin 40.1 which is mounted on the swing arm 26.1. The pivotal guiding roller 28.2 follows the pushing roller 24.2. In the situation shown in FIG. 16 the coupling pin 40.1 engages the catching and locking hook 46 of the swing arm pivoting hook 41. The swing arm pivoting hook 41 restricts the further pivotal movement of the swing arm 26.1.

The sequence from FIG. 17 to FIG. 21 shows the inverse step: the locking pawl 29.1 is pivoted into the locking position and establishes a connection between the two rollers 24.2 and 28.2. The locking pawl 29.1 catches the coupling pin 40.1 mounted on the swing arm 26.1.

In the following a second embodiment of the bale pushing device is described.

The bale pushing device according to the second embodiment comprises a pivotal pushing arm 115 which is pivotally mounted on the frame 2. This pivotal pushing arm 115 serves as the bale pushing device of the embodiment. In the embodiment the tailgate 11 and the pivotal pushing arm 115 are pivotally mounted about the same axis of rotation 112. The pivotal pushing arm 115 is constructed to push a bale from the first bale position onto the tailgate 11. A drive pivots this pivotal pushing arm 115.

The pivotal pushing arm 115 comprises an inner arm element 116 and an outer arm element 117. An inner end of the inner arm element 116 is pivotally mounted at the axis of rotation 112. The second arm element 117 is pivotally mounted to the opposed end of the inner arm element 116. The outer arm element 117 is hingedly connected with the inner arm element 116 and can be moved between an extended position, as shown in FIG. 22, and a retracted position with respect to the inner arm element 116, cf. FIG. 26 and FIG. 27. The radial extent of the pivotal pushing arm 115 with respect to the axis of rotation 112 in the extended position is substantially larger than the radial extent in the retracted position. At the distal end of the second arm element 117, a first arm-mounted guiding roller 118 and a second arm-mounted guiding roller 119 are positioned. The first arm-mounted guiding roller 118 and the second arm-mounted guiding roller 119 are spaced-apart with respect to each other in the tangential direction of the axis of rotation 112 of the pivotal pushing arm 115. The guiding rollers 118, 119 can rotate around their own rotational axis but cannot change their positions with respect to the pivotal pushing arm 115. These rotational axes are perpendicular to the drawing plain of FIG. 22.

The inner arm element 116 and the outer arm element 117 are freely rotatable with respect to each other between the extended position and the retracted position. A locking device 120 may be provided which is configured to lock the second arm element 117 in the extended position with respect to the inner arm element 116.

The pivotal pushing arm 115 with the second arm element 117 in the extended position is used to push the bale from the first bale position onto the tailgate 11 when the tailgate 11 is arranged in the bale receiving position. The retracted position of the second arm element 117 may be advantageous to bring the pivotal pushing arm 115 back to a start position as will be explained hereinafter.

The formation and transfer of a bale until release and the function of the different parts of the baling device 1 with the pivotal pushing arm 115 will now be discussed in more detail.

FIG. 22 shows the baling device 1 with the tailgate 11 in the bale receiving position, e.g. the fully closed position of the tailgate 11, and the pivotal pushing arm 115 in a first position or pushing start position and having the outer arm element 117 in the extended position. Crop material is introduced into a bale forming chamber formed between the tailgate-mounted guiding roller 113 and the fixed guiding roller 114. A bale B is being formed in the first bale position, where it is mainly supported by the support rollers 8.1, 8.2. By continuous feeding of crop material the bale B grows until a selected parameter is fulfilled, such as a desired diameter of the bale B or a given weight is achieved, a selected time interval has passed, or a selected tension in the endless belt is reached. It is remarked that the selected parameter can be monitored by any suitable sensor. For example, an ultrasonic or optical sensor, preferably directed radially with respect to the bale B may be provided to measure a diameter of the bale B being formed in the bale forming device 9. A tension sensor may monitor the tension of the endless pressing belts 10.

The bale B shown in FIG. 22 is ready to be transferred to the second bale position, for instance since the bale has a desired diameter or exerts a pressure to the belt(s) 10 which exceeds a given threshold. A first step to transfer the bale to the second bale position is to transfer the bale B onto the tailgate 11 so that the bale B is supported by the tailgate 11. To move the bale B onto the tailgate 11, the bale B is pushed by the pivotal pushing arm 115 by rotating the pivotal pushing arm 115 in a backwards direction (opposite to the travelling direction TD) with respect to the frame 2 over an angle to a second position. To avoid any unintended pivoting movement between the inner arm element 116 and the second arm element 117, the locking device 120 is activated to lock the second arm element 117 in the extended position with respect to the inner arm element 116.

FIG. 23 shows the baling device 1 after movement of the pivotal pushing arm 115 from the first position to the second position. The bale B has been pushed onto the tailgate 11. The tailgate 11 is still in the bale receiving position. The bale B remains surrounded by the bale forming means 10 while being pushed.

Due to the movement of the pivotal pushing arm 115 along the outlet 7 of the intake device 5, the function of the fixed guiding roller 114 to form the bale forming chamber holding the bale is taken over by the first arm-mounted guiding roller 118 of the pivotal pushing arm 115, i.e. the bale forming chamber formed for holding the bale is formed by an area of the belt(s) 10 between the tailgate-mounted guiding roller 113 and the first arm-mounted guiding roller 118. After the pushing movement of the pivotal pushing arm 115, the pivotal pushing arm 115 is arranged in the second position, wherein the first arm-mounted guiding roller 118 is arranged in a certain relative position with respect to the tailgate-mounted guiding roller 113 on the tailgate 11, as shown in FIG. 23.

In a second step of the transfer of the bale from the first bale position to the second bale position, the tailgate 11 and the pivotal pushing arm 115 are rotated over substantially the same angle, whereby the tailgate 11 is moved from the bale receiving position to the bale supporting position and the pivotal pushing arm 115 is moved from the second position to a third position. Since the tailgate 11 and the pivotal pushing arm 115 pivot about the same axis of rotation 112, the movement over substantially the same angle will have the result that the relative position between the tailgate-mounted guiding roller 113 and the first arm-mounted guiding roller 118 will remain the same. The pivotal pushing arm 115 remains in contact with the bale B. The bale B is still surrounded by the bale forming means 10.

FIG. 24 shows the bale forming apparatus 1 after rotation of the tailgate 11 from the bale receiving position to the bale supporting position, and simultaneous rotation of the pivotal pushing arm 115 from the second position to the third position around the common pivoting axis 112. It can be seen that the relative position between the tailgate-mounted guiding roller 113 and the first arm-mounted guiding roller 118 is the same in FIGS. 2 and 3. Further, it can be seen that the bale B is mainly supported by the tailgate 11, although some support is given by the pivotal pushing arm 115. The pivotal pushing arm 115 inhibits the bale B from rolling back towards the outlet 7.

In the first bale position next to the outlet 7 of the intake device 5, space is now available for formation of a new bale, and formation of a new bale B' has already started. The part of the endless belt between the fixed guiding roller 114 and the second arm-mounted guiding roller 119 can be used to form a bale forming chamber for the new bale B'.

It is remarked that there is a space 121 between the second arm-mounted guiding roller 119 and the support roller 8.2. To prevent that crop material falls out of the bale forming chamber through this space 121, a gap closing roller 122 is arranged in this space. This gap closing roller 122 is movable through a longitudinal slot 123 between the active position wherein it fills the space 121 (shown in FIG. 24), and an inactive position wherein it does not interfere with the movements of the tailgate 11 and the pivotal pushing arm 115. This inactive position of the gap closing roller 122 is for example shown in FIG. 24.

A wrapping device 20 with a reel 88 for wrapping material (net or foil or yarn, e.g.) is provided on the tailgate 11 to arrange a wrap around the bale B during transfer of the bale B towards and/or when the bale B is arranged on the tailgate 11 in the second bale position. The winding of the wrap around the bale B may already be started in the first bale position, as long as there is no wrap between the outlet 7 of the intake device 5 and the bale B being formed.

Preferably, a wrap is already provided around a substantial part of the circumference when the bale B is in the first bale position, whereby there is no wrapping material between the outlet 7 of the intake device 5 and the bale B being formed. The wrapping material will not hamper the entrance of crop material in the bale forming chamber, and thus the formation of a bale in the bale forming chamber. As soon as the bale has the desired size, the wrapping device 20 may release further wrapping material to provide a wrap around the complete circumference of the bale. In this way the wrap is provided relatively quickly about the complete circumference of the bale B. This reduces the risk that the crop material of the bale B will loosen or even fall apart during transfer of the bale B from the first bale position to the second bale position.

When the bale B is wrapped and thereby ready to be ejected and thereby released from the baling device 1, the tailgate 11 is moved from the bale supporting position to the bale ejecting position. This bale ejecting position may correspond to the fully open position of the tailgate 11 of the bale forming apparatus 1, wherein a bale is released from the baling device 1.

FIG. 25 shows the tailgate 11 in the bale ejecting position. In this bale ejecting position the bale B is ejected from the bale forming apparatus 1. The tensioned belt(s) 10 help to shift the bale B away from the bale forming apparatus 1. The bale B' in the first bale position continues to grow. The pivotal pushing arm 115 substantially remains in the third position (pushing and position) such that the guiding rollers 118, 119 together with the fixed guiding roller 114 form a bale forming chamber there between at least until the bale B is released from the bale forming apparatus 1 and the tailgate 11 is returned in a position in or near the bale receiving position, wherein the tailgate-mounted guiding roller 113 of the tailgate 11 can take over the function of the second arm-mounted guiding roller 119 to form a bale forming chamber together with the fixed guiding roller 114.

FIG. 26 shows a situation wherein the tailgate 11 is almost returned to the bale receiving position after release of the bale B, and wherein the pivotal pushing arm 115 is still in the third position. The gap closing roller 122 is also still in the active position.

Before the tailgate 11 can be completely pivoted back to the bale receiving position, the gap closing roller 122 has to be moved along the slot 123 to the inactive position. Further, when the function of the second arm-mounted guiding roller 119 to form a bale forming chamber together with the fixed guiding roller 114 can be taken over by the tailgate-mounted guiding roller 113, the pivotal pushing arm 115 can be moved back to the first position (pushing start position) for pushing the new bale B' from the first bale position to the second bale position.

In the embodiment shown in FIG. 22 to FIG. 29, the pivotal pushing arm 115 is a swing arm which is moved backwards and forwards over a limited range and therefore performs an oscillating movement. To make the movement of the pivotal pushing arm 115 over the bale B' in the first bale position possible the locking device 120 is deactivated so that the outer arm element 117 can freely rotate with respect to the inner arm element 116.

When carrying out a forward movement of the pivotal pushing arm 115 towards the first position, the outer arm element 117 will be pushed against the bale B'. The outer arm element 117 will either be pushed directly against the bale B' and/or against the endless belt(s) 10 forming the bale forming chamber for the bale B'. Since the outer arm element 117 can freely rotate with respect to the inner arm element 116, the outer arm element 117 will rotate with respect to the inner arm element 116. As a result, the outer arm element 117 will be moved towards the retracted position until the radial extent of the pivotal pushing arm 115 is small enough to pass the pivotal pushing arm 115 over the bale B' without touching the bale B'.

FIG. 27 shows the tailgate moved completely to the bale receiving position, and the gap closing roller 122 moved back to the inactive position. The pivotal pushing arm 115 is depicted during the forward movement with respect to the frame to bring the pivotal pushing arm 115 back to the first position, wherein the outer arm element 117 is pushed against the bale B' and, as a result, the outer arm element 117 has been rotated with respect to the inner arm element 116 from the extended position towards the retracted position.

FIG. 28 shows the pivotal pushing arm 115 after further movement towards the first position. The pivotal pushing arm 115 has passed the bale B'. The outer arm element 117 can be moved back to the extended position.

FIG. 29 shows the pivotal pushing arm 115 in the extended position. In this extended position, the locking device 120 may again lock the outer arm element 117 in this extended position. The pivotal pushing arm 115 is in a parking position above the bale B. From the comparison of FIGS. 1 and 8 is can be seen that the pivotal pushing arm 115 is arranged in an angular position further forward with respect to the frame 2 than the angular position of the first position as shown in FIG. 1. Once the outer arm element 117 of the pivotal pushing arm 115 is in the extended position, or during movement of the outer arm element 117 towards the extended position the pivotal pushing arm 115 can be moved to the first position as shown in FIG. 22.

In the meantime the introduction of crop material in the bale forming apparatus continued and the bale B' was growing. When the pivotal pushing arm 115 is positioned in the first position, the bale forming apparatus 1 is in the same state as shown in FIG. 1, and, when the bale B' fulfills the selected parameter or parameters, the transfer of bale B' from the first bale position to the second bale position may be performed, similar to the transfer of bale B described above, and a new bale may be formed in the first bale position.

The movements of the tailgate 11 and the pivotal pushing arm 115 may be configured such that continuous taking in of crop material into the bale forming apparatus 1, even at a high rate, and thus continuous driving of the bale forming apparatus 1 over the ground surface, is possible.

The only moment that feeding of crop material into the baling chamber may not be possible or is only limited possible is when the pivotal pushing arm 115 passes the outlet 7 of the intake device 5.

In one embodiment the intake device 5 comprises a feeding channel with a bottom. This bottom is arranged below the feeding rotor and is movable in a substantially vertical direction between a normal position and a dropped position. With the channel bottom in the dropped position an interior volume of the intake device is increased in comparison with an interior volume of the intake device 5 in the normal position of the movable channel bottom. The bale forming apparatus 1 is configured to move the movable bottom from the normal position to the dropped position just before the pivotal pushing arm 115 passes before the outlet 7 of the intake device 5, and to move the bottom back from the dropped position to the normal position after the pivotal pushing arm 115 has passed the outlet 7. In this way the interior of the intake device 5 is temporarily increased to store extra crop material when the pivotal pushing arm 115 passes before the outlet 7. The feeding channel serves as a buffer means for crop material.

Hereinabove, a pivotal pushing arm 115 has been described that is used as a swing arm movable over a limited angle. In an alternative, embodiment, the pivotal pushing arm 115 may be moved in a single rotation direction over 360 degrees about the axis of rotation for each cycle. Such rotating movement over 360 degrees can be carried out by an integral pivotal pushing arm which does not comprise two arm elements pivotal with respect to each other. However, this may result in a relative large height of the bale forming apparatus 1 when the arm rotates over the upper part of the cycle. To decrease the maximum height, the arm may be made up of two arm elements being movable between an extended and a retracted position. During the upper part of the cycle, the arm can be arranged in a retracted position which results in less height during this movement.

In other embodiments, also any other device capable of pushing the bale from the first bale position into the second bale position onto the movable support construction can be used.

It is remarked that hereinabove only the guiding rollers 113, 114, 118, 119 which guide the belt(s) 10 around the bale forming chamber have been denoted. The bale forming device 9 will have multiple further guiding rollers at fixed and movable location to guide the endless belt(s) 10. These guiding rollers may also include tensioning guiding rollers to tension the endless belt 10 and driving rollers to drive the endless belt 10. These guiding rollers are shown in FIGS. 1 to 8, but not denoted by reference numerals.

The pivotal movements of the movable support construction, for example the tailgate 11, and of the guiding element support, for example the pivotal pushing arm 115, may be performed by any suitable devices. In an embodiment, these movements are caused by hydraulic devices, such as hydraulic cylinders. The movements can also be implemented by electrical motors or pneumatic cylinders, e.g.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

| REFERENCE SIGNS | |
|---|---|
| B | first bale |
| B' | second bale |
| GS | ground surface |
| TD | travelling direction of the bale forming apparatus 1 |
| 1 | bale forming apparatus |
| 2 | frame, comprises the front housing part |
| 3 | wheels |
| 4 | front end with towing unit |
| 5 | intake device, comprises inlet 6 and outlet 7 |
| 6 | inlet of intake device 5 |
| 7 | outlet of intake device 5 |
| 8 | supporting rollers |
| 9 | bale forming device, comprises endless belt(s) 10 |
| 10 | endless belt(s), operate as the bale forming means |

-continued

| REFERENCE SIGNS | |
|---|---|
| 11 | pivotal tailgate, serves as bale supporting construction |
| 12 | first tailgate lever arm for pivoting the tailgate frame 17 |
| 13 | second tailgate lever arm for pivoting the tailgate frame 17 |
| 12 | first tailgate lever arm for pivoting the tailgate frame 17 |
| 13 | second tailgate lever arm for pivoting the tailgate frame 17 |
| 14 | hydraulic vertical tailgate cylinder, connected with the second tailgate lever arm 13 and the third tailgate lever arm 21 |
| 15 | hydraulic horizontal tailgate cylinder, connected with the first tailgate lever arm 12 |
| 16 | pivoting axis of tailgate frame 17 |
| 17 | pivotal tailgate frame |
| 18 | pivotal tailgate bottom |
| 19 | tailgate bottom roller, mounted at tailgate bottom 18 |
| 20 | wrapping device with a reel 88 for wrapping material |
| 21 | third tailgate lever arm for pivoting the tailgate frame 17 |
| 22 | pivoting axis of the first guiding element arm 18 |
| 23 | supporting disks, carries the pushing rollers 24.1, 24.2 and the swing arms 26.1, 26.2 |
| 24.1 | pushing roller, pushes the second bale B' |
| 24.2 | further pushing roller, pushes the first bale B |
| 25 | disk rotating axis of supporting disks 23 |
| 26.1, 26.2 | swing arms for the pivotal guiding rollers 28.1, 28.2 |
| 27.1, 27.2 | pivoting axes of the swing arms 26.1, 26.2 |
| 28.1, 28.2 | pivotal guiding roller, mounted on the swing arms 26.1, 26.2 |
| 29.1, 29.2 | locking pawls for locking the swing arms 26.1, 26.2 with the supporting arms 37.1, 37.2 |
| 30 | actuator arm |
| 31 | actuating cylinder for moving the actuator arm 30, pivotally connected with the actuator arm 30 |
| 32 | coupling device, comprises the disk engaging hook 33 and the disk locking cylinder 83 |
| 33 | disk engaging hook, can be connected with a coupling pin 34 |
| 34 | coupling pins which can be coupled with the disk engaging hook 33 |
| 35 | retarding device for the supporting disks 23 |
| 36 | fixed guiding element above the front supporting roller 8 |
| 37 | bale release control device |
| 37.1, 37.2 | supporting arms for the pushing rollers 24.1, 24.2, operate as spokes of the supporting disk 23 |
| 40.1 | coupling pin, mounted on the swing arm 26.1 for the pivotal guiding roller 28.1 |
| 41 | swing arm pivoting hook, guides the swing arm 26.1 |
| 42 | hydraulic horizontal swing arm hook cylinder, rotates the swing arm pivoting hook 41 |
| 44 | arcuate guiding edge of the swing arm pivoting hook 41 |
| 45 | pivoting axis of the swing arm pivoting hook 41 |
| 46 | catching and locking hook of the arm swing arm pivoting hook 41 |
| 47.1 | pivot point of the looking pawl 29.1 |
| 60 | pivotal tensioning arm for tensioning the pressing belts 10 |
| 63.1 | pivoting axis of the locking pawl 29.1 |
| 70 | pivoting axis between tensioning arm 60 and first tailgate lever arm 12 |
| 72 | pivoting axis between second lever arm 13 and first tailgate lever arm 12 |
| 73 | pivoting axis between third tailgate lever arm 21 and second tailgate lever arm 13 |
| 74.1, 74.2 | pivoting axes of rollers for pressing belts 10 |
| 80 | hydraulic tailgate bottom cylinder |
| 83 | disk locking cylinder for moving the coupling device 32 |
| 86 | stationary pivoting axis of third tailgate lever arm 21 |
| 88 | reel for wrapping material |
| 90.1, 90.2 | supporting arms for the pushing rollers 24.1, 24.2, operate as spokes of the supporting disk 23 |
| 95 | stationary pivoting axis of actuating cylinder 31 |
| 96 | pivoting axis between the actuating cylinder 31 and the actuator arm 30 |
| 100 | disk rotating direction |
| 112 | coinciding rotating axis of the tailgate 11 and of the pivotal pushing arm 115 |
| 113 | tailgate-mounted guiding roller, limits the bale forming chamber, mounted at the tailgate 11 |
| 114 | fixed guiding roller, limits the bale forming chamber |
| 115 | pivotal pushing arm, belongs to the bale pushing device |
| 116 | inner arm element of the pivotal pushing arm 115 |
| 117 | outer arm element of the pivotal pushing arm 115 |
| 118 | first arm-mounted guiding roller, mounted on the outer arm element 117 |
| 119 | second arm-mounted guiding roller, contributes to form a bale forming chamber while the bale B is on the tailgate 11, mounted on the outer arm element 117, serves as the pivotal guiding member |
| 120 | locking device, locks the outer arm element 117 in the extended position with the inner arm element 116 |

-continued

| REFERENCE SIGNS | |
|---|---|
| 121 | space between second arm-mounted guiding roller 119 and the support roller 8.2 |
| 122 | gap closing roller, closes the space 121 |
| 123 | longitudinal slot, guides the gap closing roller 122 |

The invention claimed is:

1. A bale forming apparatus for forming cylindrical bales of material, the bale forming apparatus comprising:
    an intake device with an outlet;
    a bale forming device;
    a pivotally mounted bale supporting construction;
    a pivoting mechanism for pivoting the bale supporting construction; and
    a bale pushing device,
    wherein the bale forming device comprises a bale forming mechanism adapted for surrounding a bale forming chamber adjacent to the outlet,
    wherein the intake device is adapted for conveying material through the outlet into the bale forming chamber,
    wherein the bale forming apparatus is adapted for forming a bale in the bale forming chamber,
    wherein the bale supporting construction is adapted for carrying a bale that has been formed in the bale forming chamber,
    wherein the pivoting mechanism is adapted for pivoting the bale supporting construction into a bale receiving position, from the bale receiving position into a bale supporting position, and from the bale supporting position into a bale ejecting position,
    wherein the bale pushing device is adapted for pushing a bale formed in the bale forming chamber away from the outlet onto the bale supporting construction being in the bale receiving position,
    wherein the bale supporting construction is adapted for being pivoted from the bale receiving position into the bale supporting position when carrying a bale such that pivoting the bale supporting construction into the bale supporting position increases the distance between the bale on the bale supporting construction and the outlet,
    wherein the bale supporting construction is further adapted for ejecting a bale when carrying the bale and being pivoted from the bale supporting position into the bale ejecting position, and
    wherein the bale forming apparatus is further adapted for providing a bale forming chamber surrounded by the bale forming mechanism adjacent to the outlet even when the bale supporting construction carries a bale and is in the bale supporting position or in the bale ejecting position.

2. The bale forming apparatus according to claim 1, wherein the bale formation apparatus is adapted such that pivoting the bale supporting construction from the bale receiving position into the bale supporting position causes a bale on the bale supporting construction to be moved in a horizontal direction away from the outlet.

3. The bale forming apparatus according to claim 1, wherein the bale forming apparatus comprises a frame, the bale supporting construction is pivotally mounted at the frame such that the bale supporting construction can be pivoted with respect to the frame around at least one horizontal pivoting axis, and the bale forming apparatus is adapted such that the bale supporting construction is pivoted around this horizontal pivoting axis when being pivoted from the bale supporting position into the bale ejecting position.

4. The bale forming apparatus according to claim 1, wherein the pivoting mechanism comprises:
    an actuator mechanism and
    a linking mechanism,
    wherein the linking mechanism is pivotally connected with the bale supporting construction in at least two pivoting axes and is pivotally connected with the actuator mechanism.

5. The bale forming apparatus according to claim 4, wherein the actuator mechanism comprises a horizontal actuator, the horizontal actuator is pivotally connected with the linking mechanism and is adapted for pivoting the bale supporting construction in an approximately horizontal direction.

6. The bale forming apparatus according to claim 4, wherein the actuator mechanism comprises a vertical actuator, the vertical actuator is pivotally connected with the linking mechanism and is adapted for pivoting the bale supporting construction in an approximately vertical direction.

7. The bale forming apparatus according to claim 1, wherein:
    the bale forming apparatus comprises a pivotal guiding member;
    the bale forming apparatus is arranged such that the pivotal guiding member is pivoted into a guiding position when the bale pushing device pushes a bale onto the bale supporting construction in the bale receiving position, or when the pivoting mechanism pivots the bale supporting construction together with a bale into the bale supporting position; and
    the pivotal guiding member in the guiding position contributes to guide the bale forming mechanism such that a bale forming chamber adjacent to the outlet is also provided when the bale supporting construction carries a bale.

8. The bale forming apparatus according to claim 1, wherein the bale forming mechanism surrounding a bale forming chamber is guided around several guiding members, and at least one guiding member for guiding the bale forming mechanism is mechanically connected with the bale supporting construction.

9. The bale forming apparatus according to claim 8, wherein the bale supporting construction comprises a bale supporting frame and a bale carrying member, the bale carrying member is adapted for carrying a bale at least when the bale supporting construction is in the bale supporting position, and the connected guiding member is mounted at the bale carrying member.

10. The bale forming apparatus according to claim 9, wherein the bale carrying member is pivotally connected with the bale supporting frame such that the bale carrying member can be pivoted with respect to the bale supporting frame around a horizontal pivoting axis, and the bale forming apparatus is adapted such that pivoting the bale supporting construction from the bale receiving position into the bale supporting position causes the bale carrying member to be pivoted upwards around the horizontal pivoting axis.

11. The bale forming apparatus according claim 1, wherein the bale pushing device comprises:
a holding device;
a pushing member mechanically connected with the holding device; and
a drive for the holding device,
wherein the holding device is mounted such that it can be rotated around a rotating axis,
wherein the drive is adapted for rotating the holding device together with the connected pushing member around the rotating axis in a rotating direction, and
wherein rotating the holding device in the rotating direction causes the connected pushing member to push the bale away from the outlet onto the bale supporting construction being in the bale receiving position.

12. The bale forming apparatus according to claim 1, wherein the bale pushing device comprises a pushing arm with an inner arm element, an outer arm element, and a drive, wherein the inner arm element is mounted such that it can be pivoted around a pushing pivoting axis, wherein the outer arm element is hingedly connected with the inner arm element, the drive is adapted for pivoting the inner arm element around the pushing pivoting axis in a pushing direction and in an opposite direction and for pivoting the outer arm element with respect to the inner arm element such that the pushing arm can be transferred into an expanded state and into a retracted state, and wherein the bale pushing device is adapted for pushing a bale away from the outlet where the pushing arm is in the expanded state and the inner arm is pivoted in the pushing direction.

13. A method for forming cylindrical bales of material, the method comprising the steps of:
conveying materials with an intake device through an outlet into a bale forming chamber formed adjacent to the outlet of the intake device;
forming a cylindrical bale with a bale forming device in the bale forming chamber by means of a bale forming mechanism surrounding the bale forming chamber;
forming the bale from material conveyed into the bale forming chamber;
pushing the bale with a bale pushing device away from the outlet onto a bale supporting construction in a bale receiving position;
pivoting the bale supporting construction carrying the bale from the bale receiving position away from the outlet into a bale supporting position such that the distance between the bale on the bale supporting construction and the outlet is increased;
pivoting the bale supporting construction still carrying the bale from the bale supporting position into a bale ejecting position;
ejecting the bale with the bale supporting construction in the bale ejecting position; and
starting the forming of a further bale in a bale forming chamber provided adjacent to the outlet and surrounded by the bale forming mechanism while the bale supporting construction is pivoted into the bale supporting position or is in the bale supporting position.

14. The bale forming method according to claim 13, wherein the step of pivoting the bale supporting construction carrying the bale from the bale receiving position into the bale supporting position causes the bale on the bale supporting construction to be shifted in an approximately horizontal direction away from the outlet.

15. The bale forming method according to claim 13, wherein the step of pivoting the bale supporting construction carrying the bale from the bale supporting position into the bale ejecting position further comprises the step of pivoting the bale supporting construction around an approximately horizontal pivoting axis away from the outlet.

16. The bale forming method according to claim 13, wherein the step pushing the bale with the bale pushing device away from the outlet further comprises the step of rotating a holding device with a drive around a rotating axis in a rotating direction,
wherein rotating the holding device in the rotating direction causes at least one pushing member mechanically connected with the holding device to be rotated on a circular path in a pushing direction, and
wherein rotating the pushing member in the pushing direction causes the bale formed in the bale forming chamber to be pushed away from the outlet and onto the bale supporting construction.

17. The bale forming method according to claim 13, wherein the step pushing the bale with the bale pushing device away from the outlet further comprises the steps that of:
transferring a pushing arm belonging to the bale pushing device and comprising an inner arm element and an outer arm element into an expanded state by pivoting the outer arm element away from the inner arm element;
pivoting the pushing arm in the expanded state in a pushing direction to push the bale away from the outlet, outlet;
pivoting the pushing into a retracted state by pivoting the outer arm element towards the inner arm element; and
retracting the pushing arm in the retracted state in a direction opposite to the pushing direction.

18. The bale forming method according to claim 13, wherein a wrapping device injects wrapping material into the space between the bale forming mechanism and the bale in the bale forming chamber while the bale is on the bale supporting construction and the bale supporting construction is in the bale receiving position, wherein the bale is wrapped with the injected wrapping material, and the wrapping of the bale is completed when the bale is on the bale supporting construction in the bale supporting position.

* * * * *